(12) United States Patent
Sanchez

(10) Patent No.: US 12,373,853 B2
(45) Date of Patent: *Jul. 29, 2025

(54) SYSTEMS AND METHODS FOR MANAGING VEHICLE OPERATOR PROFILES BASED ON TELEMATICS INFERENCES VIA AN AUCTION TELEMATICS MARKETPLACE WITH A BID PROFIT PREDICTIVE MODEL

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,645

(22) Filed: Oct. 4, 2021

(65) Prior Publication Data
US 2023/0146426 A1 May 11, 2023

(51) Int. Cl.
*G06Q 10/00* (2023.01)
*G06Q 30/0202* (2023.01)
(Continued)

(52) U.S. Cl.
CPC ......... *G06Q 30/0202* (2013.01); *G06Q 30/08* (2013.01); *G07C 5/008* (2013.01)

(58) Field of Classification Search
CPC ......... G06Q 30/08; G06Q 30/02–0206; G07C 5/00–12
See application file for complete search history.

(56) References Cited

U.S. PATENT DOCUMENTS

| 7,146,331 B1 * | 12/2006 | Young | G06Q 30/08 |
| | | | 705/37 |
| 7,383,206 B2 * | 6/2008 | Rupp | G06Q 30/08 |
| | | | 705/37 |

(Continued)

FOREIGN PATENT DOCUMENTS

| AU | 2018101217 A4 | 9/2018 |
| BG | 2743 U1 | 8/2017 |

(Continued)

OTHER PUBLICATIONS

"The open platform advantage: How to get maximum value from your telematics system" Geotab, Nov. 1, 2016 (Year: 2016).*

(Continued)

*Primary Examiner* — Rutao Wu
*Assistant Examiner* — Scott M Ross
(74) *Attorney, Agent, or Firm* — BRYAN CAVE LEIGHTON PAISNER LLP

(57) ABSTRACT

Method, system, device, and non-transitory computer-readable medium for data management. In some examples, a computer-implemented method includes: collecting a plurality of personal data sets and a plurality of sensor data sets; for each vehicle operator of the plurality of vehicle operators: generating and continually updating an operator profile, one or more telematics inferences, a data profile; and listing and continually updating the data profile onto a telematics marketplace; receiving a plurality of conditional bids for a target operator profile associated with a target data profile, each conditional bid of the plurality of conditional bids including one or more conditional payments and one or more payment conditions; determining, for each conditional bid of the plurality of conditional bids, a predicted bid-generated profit or a predicted bid-generated revenue; deter- (Continued)

mining a winning bid and an associated winning bidder; and transmitting the target operator profile to the winning bidder.

20 Claims, 5 Drawing Sheets

(51) Int. Cl.
*G06Q 30/08* (2012.01)
*G07C 5/00* (2006.01)

(56) References Cited

U.S. PATENT DOCUMENTS

| | | | |
|---|---|---|---|
| 7,424,438 B2 | 9/2008 | Vianello | |
| 7,818,588 B2 | 10/2010 | Duri et al. | |
| 7,904,219 B1 | 3/2011 | Lowrey et al. | |
| 7,917,253 B2 | 3/2011 | Inbarajan et al. | |
| 7,937,278 B1 | 5/2011 | Cripe et al. | |
| 8,044,809 B2 | 10/2011 | Farmer | |
| 8,136,146 B2 | 3/2012 | Hahn et al. | |
| 8,140,359 B2 | 3/2012 | Daniel | |
| 8,160,952 B1 | 4/2012 | Fell et al. | |
| 8,239,220 B2 | 8/2012 | Kidd et al. | |
| 8,364,613 B1 | 1/2013 | Lin et al. | |
| 8,527,302 B2 | 9/2013 | Johnson, Jr. et al. | |
| 8,554,600 B2 | 10/2013 | Reisman | |
| 8,560,456 B2 | 10/2013 | Williams | |
| 8,577,703 B2 | 11/2013 | McClellan et al. | |
| 8,595,034 B2 | 11/2013 | Bauer et al. | |
| 8,712,893 B1 | 4/2014 | Brandmaier et al. | |
| 8,731,627 B2 | 5/2014 | Inabathuni et al. | |
| 8,892,451 B2 | 11/2014 | Everett et al. | |
| 9,082,072 B1 | 7/2015 | Wedding et al. | |
| 9,087,332 B2 | 7/2015 | Bagherjeiran et al. | |
| 9,135,756 B2 | 9/2015 | Doughty et al. | |
| 9,306,924 B2 | 4/2016 | Lehmann | |
| 9,489,640 B2 | 11/2016 | Neuhauser et al. | |
| 9,990,781 B2 * | 6/2018 | Haidar | G07C 5/006 |
| 10,134,042 B1 | 11/2018 | Prasad et al. | |
| 10,163,163 B1 | 12/2018 | He et al. | |
| 10,185,999 B1 | 1/2019 | Konrardy et al. | |
| 10,216,485 B2 | 2/2019 | Misra et al. | |
| 10,248,974 B2 * | 4/2019 | Firth | G06Q 10/04 |
| 10,360,576 B1 | 7/2019 | Hsu-Hoffman | |
| 10,360,601 B1 | 7/2019 | Adegan | |
| 10,373,257 B1 | 8/2019 | Iqbal et al. | |
| 10,423,982 B2 | 9/2019 | Wasserman et al. | |
| 10,430,745 B2 | 10/2019 | Rani et al. | |
| 10,462,225 B2 | 10/2019 | Chen et al. | |
| 10,510,120 B1 * | 12/2019 | Roll | G06Q 40/08 |
| 10,580,081 B2 | 3/2020 | Rackley, III et al. | |
| 10,664,920 B1 | 5/2020 | Roll et al. | |
| 10,699,332 B1 * | 6/2020 | Saito | G06Q 30/08 |
| 10,713,728 B1 | 7/2020 | Roll et al. | |
| 11,676,014 B1 * | 6/2023 | Hallac | B60W 50/0097 |
| | | | 706/12 |
| 2002/0143584 A1 * | 10/2002 | Lundegren | G06Q 40/08 |
| | | | 705/37 |
| 2003/0139179 A1 | 7/2003 | Fuchs et al. | |
| 2003/0200121 A1 * | 10/2003 | Santoloci | G06Q 40/08 |
| | | | 705/4 |
| 2004/0139034 A1 | 7/2004 | Farmer | |
| 2004/0153362 A1 | 8/2004 | Bauer et al. | |
| 2004/0180647 A1 | 9/2004 | Schwinke et al. | |
| 2005/0197889 A1 | 9/2005 | Prigogin et al. | |
| 2006/0053038 A1 | 3/2006 | Warren et al. | |
| 2006/0136322 A1 * | 6/2006 | Barry | G06Q 30/08 |
| | | | 705/37 |
| 2006/0253307 A1 * | 11/2006 | Warren | G06Q 40/08 |
| | | | 705/4 |
| 2007/0016542 A1 | 1/2007 | Rosauer et al. | |
| 2007/0027726 A1 | 2/2007 | Warren et al. | |
| 2008/0052219 A1 * | 2/2008 | Sandholm | G06Q 40/04 |
| | | | 705/37 |
| 2008/0288889 A1 | 11/2008 | Hunt et al. | |
| 2009/0002148 A1 | 1/2009 | Horvitz | |
| 2009/0006870 A1 | 1/2009 | Duri et al. | |
| 2009/0089160 A1 | 4/2009 | Oesterling | |
| 2009/0109037 A1 | 4/2009 | Farmer | |
| 2010/0030582 A1 | 2/2010 | Rippel et al. | |
| 2010/0030586 A1 | 2/2010 | Taylor et al. | |
| 2010/0076646 A1 | 3/2010 | Basir et al. | |
| 2010/0114734 A1 | 5/2010 | Giuli et al. | |
| 2010/0131303 A1 * | 5/2010 | Collopy | G06Q 30/0251 |
| | | | 340/5.82 |
| 2010/0268619 A1 | 10/2010 | Farmer | |
| 2011/0130916 A1 | 6/2011 | Mayer | |
| 2011/0302000 A1 * | 12/2011 | Dance | G06Q 30/0283 |
| | | | 705/7.29 |
| 2012/0036038 A1 | 2/2012 | Farmer | |
| 2012/0066007 A1 * | 3/2012 | Ferrick | G06Q 50/30 |
| | | | 705/4 |
| 2012/0072244 A1 | 3/2012 | Collins et al. | |
| 2012/0173326 A1 * | 7/2012 | Tao | G06Q 30/0244 |
| | | | 705/14.43 |
| 2012/0271689 A1 | 10/2012 | Etheredge et al. | |
| 2012/0290308 A1 | 11/2012 | Detwiller et al. | |
| 2012/0290500 A1 * | 11/2012 | Ettl | G06Q 30/0283 |
| | | | 705/36 R |
| 2012/0303203 A1 | 11/2012 | Olsen et al. | |
| 2013/0138460 A1 | 5/2013 | Schumann et al. | |
| 2013/0179198 A1 | 7/2013 | Bowne et al. | |
| 2013/0204813 A1 | 8/2013 | Master et al. | |
| 2013/0254019 A1 * | 9/2013 | Liu | G06Q 30/02 |
| | | | 705/14.46 |
| 2014/0032045 A1 | 1/2014 | Smirnov et al. | |
| 2014/0058761 A1 | 2/2014 | Freiberger et al. | |
| 2014/0164579 A1 | 6/2014 | Douthitt et al. | |
| 2014/0172467 A1 | 6/2014 | He et al. | |
| 2014/0195272 A1 | 7/2014 | Sadiq et al. | |
| 2014/0229207 A1 | 8/2014 | Swamy et al. | |
| 2014/0278574 A1 | 9/2014 | Barber | |
| 2014/0316825 A1 | 10/2014 | Van et al. | |
| 2014/0350970 A1 | 11/2014 | Schumann et al. | |
| 2014/0359552 A1 | 12/2014 | Misra et al. | |
| 2014/0372221 A1 | 12/2014 | Momin et al. | |
| 2014/0379523 A1 | 12/2014 | Park | |
| 2015/0134455 A1 | 5/2015 | Gorpynich et al. | |
| 2015/0228004 A1 | 8/2015 | Bednarek et al. | |
| 2015/0269681 A1 | 9/2015 | Kalinadhabhotla | |
| 2015/0294565 A1 | 10/2015 | Follmer et al. | |
| 2015/0348180 A1 * | 12/2015 | Sia, Jr. | G06Q 30/08 |
| | | | 705/26.3 |
| 2015/0370251 A1 | 12/2015 | Siegel et al. | |
| 2016/0035020 A1 * | 2/2016 | Du Preez | G06Q 40/04 |
| | | | 705/26.3 |
| 2016/0203278 A1 | 7/2016 | Shoemaker | |
| 2016/0225095 A1 | 8/2016 | Biemer et al. | |
| 2016/0267396 A1 | 9/2016 | Gray et al. | |
| 2017/0053295 A1 | 2/2017 | Tiell et al. | |
| 2017/0054611 A1 | 2/2017 | Tiell | |
| 2017/0124660 A1 * | 5/2017 | Srivastava | G06Q 40/08 |
| 2017/0178169 A1 * | 6/2017 | Liu | G06Q 30/0275 |
| 2017/0255966 A1 | 9/2017 | Khoury | |
| 2017/0255981 A1 | 9/2017 | Van Niekerk et al. | |
| 2017/0257345 A1 | 9/2017 | Westra et al. | |
| 2017/0364821 A1 | 12/2017 | Mathur et al. | |
| 2018/0025430 A1 | 1/2018 | Perl et al. | |
| 2018/0075380 A1 | 3/2018 | Perl et al. | |
| 2018/0260908 A1 | 9/2018 | Collopy et al. | |
| 2018/0300816 A1 | 10/2018 | Perl et al. | |
| 2018/0315318 A1 | 11/2018 | Farnham, IV et al. | |
| 2019/0031097 A1 | 1/2019 | O'Herlihy et al. | |
| 2019/0050870 A1 | 2/2019 | Chen | |
| 2019/0050904 A1 | 2/2019 | Wasserman et al. | |
| 2019/0086229 A1 | 3/2019 | Chintakindi | |
| 2019/0102689 A1 | 4/2019 | Lassoued et al. | |
| 2019/0102840 A1 | 4/2019 | Perl et al. | |
| 2019/0130456 A1 * | 5/2019 | De La Breteche | G06N 7/01 |
| 2019/0147513 A1 | 5/2019 | Giuli et al. | |
| 2019/0347582 A1 | 11/2019 | Allen et al. | |
| 2019/0347675 A1 * | 11/2019 | Yang | A63F 13/60 |
| 2019/0384870 A1 | 12/2019 | Shiraishi et al. | |

(56) References Cited

U.S. PATENT DOCUMENTS

| | | | |
|---|---|---|---|
| 2020/0013498 A1 | 1/2020 | Gelber | |
| 2020/0103892 A1 | 4/2020 | Cella et al. | |
| 2020/0108840 A1 | 4/2020 | Andres et al. | |
| 2020/0126324 A1 | 4/2020 | Hutchins et al. | |
| 2020/0211122 A1 | 7/2020 | Chen et al. | |
| 2020/0357075 A1* | 11/2020 | Dahl | G06F 16/27 |
| 2023/0033876 A1 | 2/2023 | Villero et al. | |

FOREIGN PATENT DOCUMENTS

| | | |
|---|---|---|
| CN | 107845039 A | 3/2018 |
| CN | 108171708 A | 6/2018 |
| CN | 108492053 A | 9/2018 |
| CN | 109118055 A | 1/2019 |
| CN | 110852894 A | 2/2020 |
| GB | 2523227 A | 8/2015 |
| GB | 2548738 A | 9/2017 |
| JP | 4494791 B2 | 6/2010 |
| KR | 10-1823015 B1 | 1/2018 |
| KR | 10-2129324 B1 | 7/2020 |
| WO | 2006/062693 A2 | 6/2006 |
| WO | 2008/071064 A1 | 6/2008 |
| WO | 2014/106299 A1 | 7/2014 |
| WO | 2015/187558 A1 | 12/2015 |
| WO | 2017/195228 A1 | 11/2017 |
| WO | 2018/007953 A1 | 1/2018 |
| WO | 2020/015526 A1 | 1/2020 |

OTHER PUBLICATIONS

Abdelrahman et al., "Data-driven Robust Scoring Approach for Driver Profiling Applications", doi: 10.1109/GLOCOM.2018.8647971, Dec. 2018, pp. 1-6.

Alghuson, "An Integrated Score-Based Traffic Law Enforcement and Network Management in Connected Vehicle Environment", Southern Methodist University, 2020, pp. 1-227.

Analytics and insights services that help you understand your book of business and individual customers from every angle, Insurance & Mobility Solutions, Retrieved from https://ims.tech/analytics/, Jul. 2020, 11 pages.

Baecke et al., "The value of vehicle telematics data in insurance risk selection processes", Decision Support Systems, vol. 98, Jun. 2017, pp. 69-79.

Bian et al., "Good drivers pay less: A study of usage-based vehicle insurance models", Transportation Research Part A: Policy and Practice, vol. 107, 2018, pp. 20-34.

Bourque, "eBay-Like Bidding Meets Facebook with Social Media Auction App BuddyBid", SocialMediaToday, Retrieved from https://www.socialmediatoday.com/news/ebay-like-bidding-meets-facebook-with-social-media-auction-app-buddybid/454231/, Jun. 2015, pp. 1-3.

Cheng et al., Research on safe Driving Scoring System and Personalized Ratemaking of Vehicle Insurance based on OBD Data, The 3rd International Conference on Crowd Science and Engineering (ICCSE'18). Doi: 10.11453265689.3265696, Jul. 28-31, 2018, 8 pages.

Crawford, Bradley, "Mew Methods of Payment and New Forms of Money", Banking & Finance Law Review 20:3: 393-409. HAB Press Limited, Toronto, Canada. (Year: 2004).

Driving score, "Score and rate consistently from multiple sources", Risk Solutions, Retrieved from https://risk.lexisnexis.com/products/driving-score, Jul. 2020, pp. 1-3.

Duri et al., "Data Protection and Data Sharing in Telematics", Mobile Networks and Applications, vol. 9, No. 6, 2004, pp. 693-701.

Duri et al., "Framework for Security and Privacy in Automotive Telematics", In Proceedings of the 2nd international workshop on Mobile commerce, 2002, pp. 25-32.

Fan et al., "A Comparison of Underwriting Decision Making Between Telematics-Enabled UBI and Traditional Auto Insurance", Advances in Management and Applied Economics, vol. 7, No. 1, 2017, pp. 17-30.

FICO Safe Driving Score, Retrieved from https://www.fico.com/en/resource-download-file/4571. See highlighted sections, Jan. 2020, 3 pages.

FloowDrive, "The Floow", Retrieved from https://www.thefloow.com/our-solutions/floowdrive/, Jul. 2020, pp. 1-7.

FloowScore, "The Floow", Retrieved from https://www.thefloow.com/our-solutions/floowscore/, Jul. 2020, pp. 1-3.

Garrison et al., "New Verisk Data Exchange Integration for Insurance Telematics Now Available on the Geotab Marketplace", Verisk, Retrieved from https://www.verisk.com/press-releases/2020/may/new-verisk-data-exchange-integration-for-insurance-telematics-now-available-on-the-geotab-marketplace/, May 2020, 2 pages.

Honcho launches reverse auction car insurance app, Finextra, Retrieved from https://www.finextra.com/pressarticle/79851/honcho-launches-reverse-auction-car-insurance-app, Sep. 2019, pp. 1-4.

How does the car insurance tier system affect my premium?, Cover, Retrieved from https://cover.com/blog/car-insurance-tiers/, Jan. 2020, pp. 1-5.

International Search Report and Written Opinion received for PCT Patent Application No. PCT/US2021/040272, mailed on Oct. 5, 2021, 8 pages.

International Search Report and Written Opinion received for PCT Patent Application No. PCT/US2021/040282, mailed on Oct. 5, 2021, 9 pages.

International Search Report and Written Opinion received for PCT Patent Application No. PCT/US2021/040291, mailed on Oct. 5, 2021, 10 pages.

International Search Report and Written Opinion received for PCT Patent Application No. PCT/US2021/040295, mailed on Oct. 15, 2021, 8 pages.

International Search Report and Written Opinion received for PCT Patent Application No. PCT/US2021/040308, mailed on Oct. 14, 2021, 7 pages.

International Search Report and Written Opinion received for PCT Patent Application No. PCT/US2021/040314, mailed on Oct. 15, 2021, 7 pages.

International Search Report and Written Opinion received for PCT Patent Application No. PCT/US2021/040317, mailed on Oct. 5, 2021, 13 pages.

International Search Report and Written Opinion received for PCT Patent Application No. PCT/US2021/040320, mailed on Oct. 5, 2021, 12 pages.

International Search Report and Written Opinion received for PCT Patent Application No. PCT/US2021/040325, mailed on Oct. 5, 2021, 10 pages.

International Search Report and Written Opinion received for PCT Patent Application No. PCT/US2021/040329, mailed on Oct. 5, 2021, 11 pages.

Lavendelis et al., "Multi-Agent Auction Based Simulation Tool for an Insurance Policy Market", Applied Computer Systems, vol. 15, No. 1, 2014, pp. 5-13.

Liu et al., "A risky driving behavior scoring model for the personalized automobile insurance pricing", Proceedings of the 2nd International Conference on Crowd Science and Engineering, ICCSE'17. doi: 10.1145/3126973.3126978, 2017, 7 pages.

Machine Learning and FICO Scores, FICO Decisions, Retrieved from https://www.mba.org/assets/Documents/Member%20White%20Papers/Machine_Learning_and_FICO_Scores_4611WP_EN.pdf, 2018, pp. 1-11.

Maerien et al., "A Secure Multi-Application Platform for Vehicle Telematics", Vehicular Technology Conference, 1988, IEEE 38th, 2010, pp. 1-6.

Reininger et al., "A first look at vehicle data collection via smartphone sensors", In 2015 IEEE Sensors Applications Symposium (SAS), 2015, pp. 1-6.

Siami et al., "Generating a Risk Profile for Car Insurance Policyholders: a Deep Learning Conceptual Model", In Australasian Conference on Information Systems, 2017, pp. 1-8.

Snapshot, ConnectedWorld, Retrieved from https://connectedworld.com/ product-items/snapshot/, Aug. 2020, 5 pages.

Telematics Exchange, LexisNexis—Risk Solutions. Retrieved from https://risk.lexisnexis.com/products/telematics-exchange, Jul. 2020, pp. 1-3.

(56) References Cited

OTHER PUBLICATIONS

Toledo et al., "Can feedback from in-vehicle data recorders improve driver behavior and reduce fuel consumption?", Transportation Research Part A: Policy and Practice, vol. 94, 2016, pp. 194-204.

Tramér et al., "Stealing Machine Learning Models via Prediction APIs", Proceedings of the 25th USENIX Security Symposium, Aug. 2015, pp. 601-618.

Verma, "Multi-tenancy redefined with admin partitions", https://www.citrix.com/blogs/2014/11/20/multi-tenancy-redefined-with-admin-partitions/, Nov. 2014, 5 pages.

Wang et al., "Consumer Characteristics, Social influence and system Factors on online Group-Buying repurchasing intention", Journal of Electronic Commerce Research, ProQuest Document ID:P 1541488270 (Year: 2014).

Weidner et al., "Telematic driving profile classification in car insurance pricing", Annals of actuarial science, vol. 11, No. 2, 2017, pp. 213-236.

Werner, "Analytics behind the perfect risk score & predictive model", Retrieved from https://testbacblog.files.wordpress.com/2018/10/click-here-to-access-octos-white-paper.pdf, Oct. 2018, 12 pages.

Werner, "Increased data connectivity set to take telematics based auto insurance in new directions", Retrieved from https://web.archive.org/web/20180908034100/https://www.willistowerswatson.com/en-US/insights/2016/08/new-data-connectivity-changes-path-of-insurance-telematics, Aug. 2016, 3 pages.

"Commercial Vehicle Telematics Market Report", Proquest Document ID: 2047381839, Asia News Monitor (Year: Jun. 1, 2018).

McCarthy et al., Access to In-vehicle data and resources, Final Report, 2017, 259 pages.

Siami et al., A mobile telematics pattern recognition framework for driving behavior extraction, IEEE Transactions on Intelligent Transportation Systems, vol. 22, No. 3, 2021, pp. 1459-1472.

\* cited by examiner

SYSTEMS AND METHODS FOR MANAGING VEHICLE OPERATOR PROFILES BASED ON TELEMATICS INFERENCES VIA AN AUCTION TELEMATICS MARKETPLACE WITH A BID PROFIT PREDICTIVE MODEL

CROSS-REFERENCES TO RELATED APPLICATIONS

The following eight applications, including this one, are being filed concurrently and the other seven are hereby incorporated by reference in their entirety for all purposes:

1. U.S. patent application Ser. No. 17/493,517, titled "SYSTEMS AND METHODS FOR MANAGING VEHICLE OPERATOR PROFILES BASED ON INCREMENTAL TELEMATICS INFERENCES VIA A TELEMATICS MARKETPLACE";
2. U.S. patent application Ser. No. 17/493,565, titled "SYSTEMS AND METHODS FOR MANAGING VEHICLE OPERATOR PROFILES BASED ON RELATIVE TELEMATICS INFERENCES VIA A TELEMATICS MARKETPLACE";
3. U.S. patent application Ser. No. 17/,493,588, titled "SYSTEMS AND METHODS FOR MANAGING VEHICLE OPERATOR PROFILES BASED CHARACTERIZATION-SPECIFIC TELEMATICS INFERENCES VIA A TELEMATICS MARKETPLACE";
4. U.S. patent application Ser. No. 17/493,613, titled "SYSTEMS AND METHODS FOR INCREASING PROFITABILITY OF USER MANAGEMENT MODELS BASED ON TELEMATICS INFERENCES VIA A TELEMATICS MARKETPLACE";
5. U.S. patent application Ser. No. 17/493,623, titled "SYSTEMS AND METHODS FOR USER MANAGEMENT MODEL TESTING BASED ON TELEMATICS INFERENCES VIA A TELEMATICS MARKETPLACE";
6. U.S. patent application Ser. No. 17/,493,631, titled "SYSTEMS AND METHODS FOR MANAGING VEHICLE OPERATOR PROFILES BASED ON TELEMATICS INFERENCES VIA AN AUCTION TELEMATICS MARKETPLACE WITH CONDITIONAL BIDDING";
7. U.S. patent application Ser. No. 17/,493,645, titled "SYSTEMS AND METHODS FOR MANAGING VEHICLE OPERATOR PROFILES BASED ON TELEMATICS INFERENCES VIA AN AUCTION TELEMATICS MARKETPLACE WITH A BID PROFIT PREDICTIVE MODEL"; and
8. U.S. patent application Ser. No. 17/493,660, titled "SYSTEMS AND METHODS FOR MATCH EVALUATION BASED ON CHANGE IN TELEMATICS INFERENCES VIA A TELEMATICS MARKETPLACE".

U.S. Patent Application No. 63/049,052 is hereby incorporated by reference in their entirety for all purposes.

The following ten applications are hereby incorporated by reference in their entirety for all purposes:

1. International PCT Application No. PCT/US2021/040272, filed Jul. 2, 2021;
2. International PCT Application No. PCT/US2021/040282, filed Jul. 2, 2021;
3. International PCT Application No. PCT/US2021/040291, filed Jul. 2, 2021;
4. International PCT Application No. PCT/US2021/040295, filed Jul. 2, 2021;
5. International PCT Application No. PCT/US2021/040308, filed Jul. 2, 2021;
6. International PCT Application No. PCT/US2021/040314, filed Jul. 2, 2021;
7. International PCT Application No. PCT/US2021/040317, filed Jul. 2, 2021;
8. International PCT Application No. PCT/US2021/040320, filed Jul. 2, 2021;
9. International PCT Application No. PCT/US2021/040325, filed Jul. 2, 2021; and
10. International PCT Application No. PCT/US2021/040329, filed Jul. 2, 2021.

FIELD OF THE DISCLOSURE

Some embodiments of the present disclosure are directed to management of user information. More particularly, certain embodiments of the present disclosure provide systems and methods for managing vehicle operator profiles based on telematics inferences via an auction telematics marketplace with bid profit prediction. Merely by way of example, the present disclosure has been applied to management of user information using a telematics-data-based marketplace, but it would be recognized that the present disclosure has much broader range of applicability.

BACKGROUND

Conventional telematics data are often collected using party-specific devices and for the sole use of that party. Customers of the party are often asked by the party to install the party-specific device such that telematics data of the customer can be collected. If a customer is interested in exploring products of various parties, it is often required that the customer collect and install multiple party-specific devices, one after another, sequentially, such that each party may collect telematics using their corresponding party-specific device. There is a need for systems and methods for collecting and sharing of telematics data with improved universality.

BRIEF SUMMARY OF THE DISCLOSURE

Some embodiments of the present disclosure are directed to management of user information. More particularly, certain embodiments of the present disclosure provide systems and methods for managing vehicle operator profiles based on telematics inferences via an auction telematics marketplace with bid profit prediction. Merely by way of example, the present disclosure has been applied to management of user information using a telematics-data-based marketplace, but it would be recognized that the present disclosure has much broader range of applicability.

According to various embodiments, a computer-implemented method for data management includes: collecting a plurality of personal data sets associated with a plurality of vehicle operators continually; collecting a plurality of sensor data sets associated with the plurality of vehicle operators continually via one or more sensing modules; for each vehicle operator of the plurality of vehicle operators: generating and continually updating an operator profile including the personal data set associated with the vehicle operator; determining and continually updating one or more telematics inferences based at least in part upon the sensor data set associated with the vehicle operator; generating and continually updating a data profile including the one or more telematics inferences associated with the vehicle operator; and listing and continually updating the data profile onto a telematics marketplace to be accessible by a plurality of marketplace participants; receiving, from a plurality of bidders of the plurality of marketplace participants, a plurality of conditional bids for a target operator profile associated with a target data profile selected from the listed data profiles of the plurality of vehicle operators, each conditional bid of the plurality of conditional bids including one or more conditional payments and one or more payment conditions; determining, for each conditional bid of the plurality of conditional bids, a predicted bid-generated profit or a predicted bid-generated revenue; determining, based at least in part upon the predicted profit or predicted bid-generated revenue, a winning bid and an associated winning bidder; and transmitting the target operator profile to the winning bidder.

According to various embodiments, a computing system for data management, the computing system includes: one or more processors; and a memory storing instructions that, upon execution by the one or more processors, cause the computing system to perform one or more processes including: collecting a plurality of personal data sets associated with a plurality of vehicle operators continually; collecting a plurality of sensor data sets associated with the plurality of vehicle operators continually via one or more sensing modules; for each vehicle operator of the plurality of vehicle operators: generating and continually updating an operator profile including the personal data set associated with the vehicle operator; determining and continually updating one or more telematics inferences based at least in part upon the sensor data set associated with the vehicle operator; generating and continually updating a data profile including the one or more telematics inferences associated with the vehicle operator; and listing and continually updating the data profile onto a telematics marketplace to be accessible by a plurality of marketplace participants; receiving, from a plurality of bidders of the plurality of marketplace participants, a plurality of conditional bids for a target operator profile associated with a target data profile selected from the listed data profiles of the plurality of vehicle operators, each conditional bid of the plurality of conditional bids including one or more conditional payments and one or more payment conditions; determining, for each conditional bid of the plurality of conditional bids, a predicted bid-generated profit or a predicted bid-generated revenue; determining, based at least in part upon the predicted profit or predicted bid-generated revenue, a winning bid and an associated winning bidder; and transmitting the target operator profile to the winning bidder.

According to various embodiments, a non-transitory computer-readable medium storing instructions for data management, the instructions upon execution by one or more processors of a computing system, cause the computing system to perform one or more processes including: collecting a plurality of personal data sets associated with a plurality of vehicle operators continually; collecting a plurality of sensor data sets associated with the plurality of vehicle operators continually via one or more sensing modules; for each vehicle operator of the plurality of vehicle operators: generating and continually updating an operator profile including the personal data set associated with the vehicle operator; determining and continually updating one or more telematics inferences based at least in part upon the sensor data set associated with the vehicle operator; generating and continually updating a data profile including the one or more telematics inferences associated with the vehicle operator; and listing and continually updating the data profile onto a telematics marketplace to be accessible by a plurality of marketplace participants; receiving, from a plurality of bidders of the plurality of marketplace participants, a plurality of conditional bids for a target operator profile associated with a target data profile selected from the listed data profiles of the plurality of vehicle operators, each conditional bid of the plurality of conditional bids including one or more conditional payments and one or more payment conditions; determining, for each conditional bid of the plurality of conditional bids, a predicted bid-generated profit or a predicted bid-generated revenue; determining, based at least in part upon the predicted profit or predicted bid-generated revenue, a winning bid and an associated winning bidder; and transmitting the target operator profile to the winning bidder.

Depending upon the embodiment, one or more benefits may be achieved. These benefits, features, and advantages of the present disclosure can be fully appreciated with reference to the detailed description and accompanying drawings that follow.

DETAILED DESCRIPTION OF THE DISCLOSURE

Some embodiments of the present disclosure are directed to management of user information. More particularly, certain embodiments of the present disclosure provide systems and methods for managing vehicle operator profiles based on telematics inferences via an auction telematics marketplace with bid profit prediction. Merely by way of example, the present disclosure has been applied to management of user information using a telematics-data-based marketplace, but it would be recognized that the present disclosure has much broader range of applicability.

Figure 1:
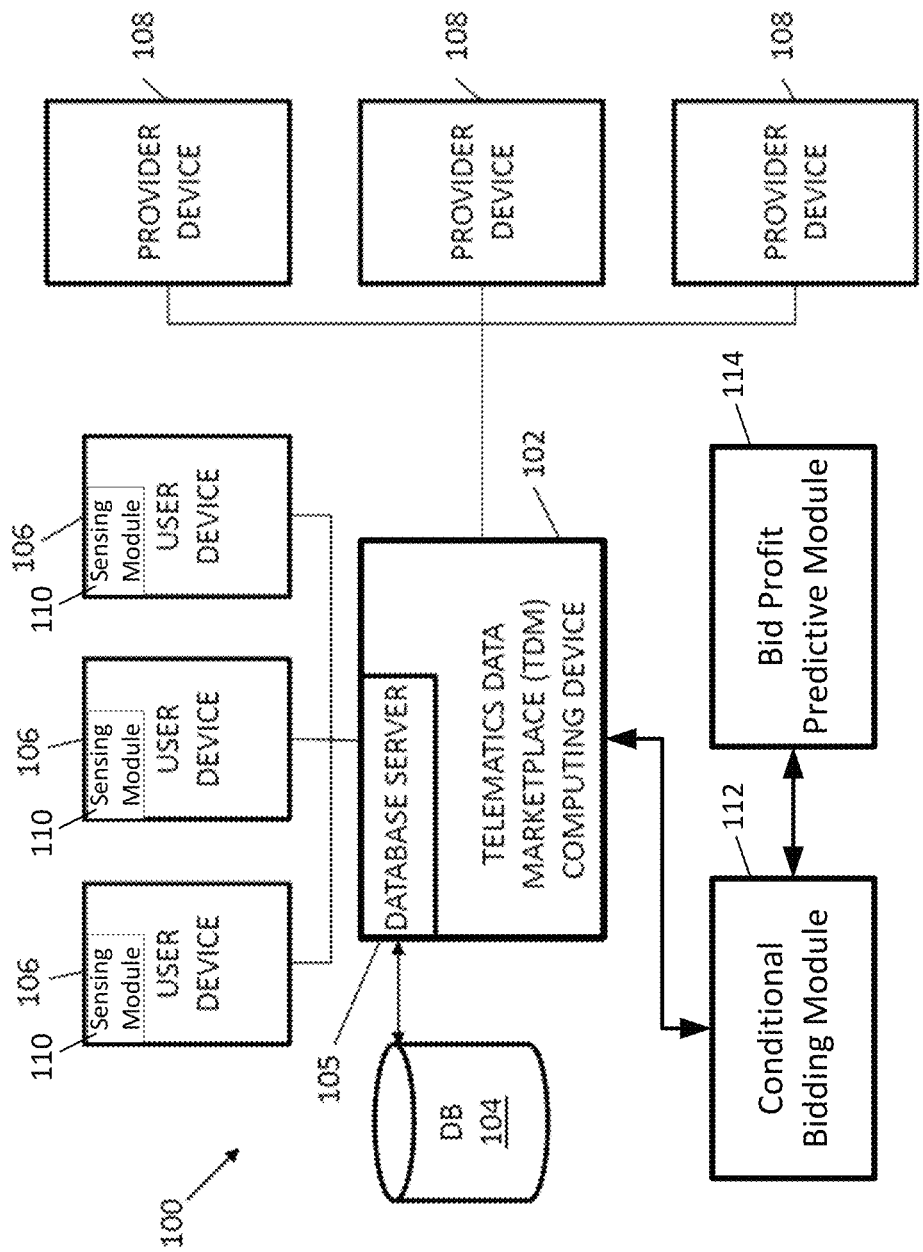
FIG. 1 is a simplified diagram showing a telematics data marketplace (TDM) computing system according to various embodiments of the present disclosure.

One or More Systems for Providing a Telematics Data Marketplace According to Various Embodiments FIG. 1 is a simplified diagram showing a telematics data marketplace (TDM) computing system 100 according to various embodiments of the present disclosure. This figure is merely an example, which should not unduly limit the scope of the claims. One of ordinary skill in the art would recognize many variations, alternatives, and modifications. In some examples, the system 100 includes TDM computing system 102, a database (DB) 104, one or more user devices 106, and one or more provider devices 108. In certain examples, the system 100 is configured to implement method 300 of FIG. 3. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the TDM computing system 102 includes a database server 105 configured to be communicatively coupled to the database 104 to store and/or retrieve data. In some examples, the TDM computing system 102 is configured to be in communication with the one or more user devices 106. In some examples, the TDM computing system 102 is configured to be in communication with the one or more provider devices 108 to receive insurance offers. In certain examples, the TDM computing system 102 is configured to receive user data (e.g., geographic coordinate data, time measurement data, and/or telematics data) from the one or more user devices 106 and/or from the database 104. In various embodiments, the database 104 includes a local storage device or a remote storage device, such as cloud storage. In various examples, the TDM computing system 102 may broker a deal between a user, associated with a user device 106 and a provider, associated with a provider device 108, and the provider may offer reduced vehicle insurance premiums as a reward for access to user data. In some examples, the TDM computing system 102 may restrict access to user data for certain providers. For example, a user may specify that certain providers are not permitted to purchase user data of said user such that the TDM computing system 102 may restrict those providers from accessing said user data. In certain examples, a user may grant or deny access to one or more providers through an associated user device 106.

In various embodiments, each user device of the one or more user devices 106 includes a web browser and/or a software application for accessing the TDM computing system 102, such as via a wired or wireless connection. For example, the one or more user devices 106 may be communicatively coupled to TDM computing system 102 through the Internet, a local area network (LAN), a wide area network (WAN), an integrated services digital network (ISDN), a dial-up-connection, a digital subscriber line (DSL), a cellular phone connection, and/or a cable modem. The one or more user devices 106 may include a desktop computer, a laptop computer, a smartphone, a tablet, and/or a wearable device. In some examples, each user device of the one or more user devices 106 includes a GPS sensor, an accelerometer, and/or a gyroscope. In certain examples, the one or more user devices 106 may collect user data, such as geographic coordinate data, time measurement data, and/or telematics data.

In some examples, the GPS sensor may utilize GPS techniques to determine a measurement of geographic coordinates of a corresponding user device 106. The GPS sensor may provide real-time and/or historic navigation data. The GPS sensor may return an error estimate along with the measured geographic location. The measured geographic location and the error estimate may provide an area (e.g., a radius around the measured geographic location) where the corresponding user device 106 may be located with a probability value. In some examples, the accelerometer may be configured to measure a linear and/or angular acceleration of a corresponding user device 106 at a given moment in time. In some examples, the gyroscope may be configured to determine an orientation of an associated user device 106. In some examples, the accelerometer and the gyroscope together may be used to determine a direction of acceleration of the associated user device 106. In various examples, data generated by the GPS sensor, accelerometer, and/or gyroscope may be used (e.g., by TDM computing system 102 and/or user devices 106) to generate telematics data (e.g., a location, orientation, acceleration, velocity, etc.) of the corresponding user device 106. In certain examples, such telematics data may be provided to providers (e.g., associated with provider devices 108, shown in FIG. 1) by the TDM computing system 102, for example, in exchange for a reward to the users associated with the one or more user devices 106.

In various embodiments, each provider device of the one or more provider devices 108 includes a web browser and/or a software application for accessing the TDM computing system 102, such as via a wired or wireless connection. For example, the one or more provider devices 108 may be communicatively coupled to TDM computing system 102 through the Internet, a local area network (LAN), a wide area network (WAN), an integrated services digital network (ISDN), a dial-up-connection, a digital subscriber line (DSL), a cellular phone connection, and/or a cable modem. The one or more provider devices 108 may include a desktop computer, a laptop computer, a smartphone, a tablet, and/or a wearable device.

In various embodiments, the one or more provider devices 108 is configured to transmit one or more offers to the TDM computing system 102. In some examples, the one or more offers includes a list of desired user data and an accompanying purchase price. In certain examples, the purchase price is in the form of a rewards points credit, a cash amount, a gift card, a charitable contribution amount, or a carbon offset credit amount. For example, a provider may specify, via an associated provider device, location-based data, number of users, and cash reward. As another example, a provider may specify, via an associated provider device, location-based data and time measurement data, number of users, and carbon offset credit.

In various embodiments, each user device includes one or more sensing modules 110 configured to at least collect sensor data associated with the user device. In some examples, the one or more sensing modules 110 includes a common module used by a plurality of mobile applications. In some examples, the common module is a software module or a common hardware module. In some examples, each vehicle operator uses at least one mobile application of the plurality of mobile applications. In some examples, the plurality of mobile applications includes a system software application, an entertainment software application, a gaming software application, a navigation software application, and/or an environment software application.

In various embodiments, the system further includes a conditional bidding module 112 configured to provide one or more auction functions to a telematics data based marketplace. In various examples, the conditional bidding module 112 is configured to receive, such as from a plurality of bidders that may or may not be marketplace participants of an telematics auction marketplace, a plurality of conditional bids. In some examples, the plurality of conditional bids are for a target operator profile associated with a target data profile. In certain examples, the target data profile may be selected from listed data profiles of a plurality of vehicle operators. In some examples, each conditional bid includes one or more conditional payments and associated one or more payment conditions. In various examples, the conditional bidding module 112 is further configured to determine a winning bid and an associated winning bidder based at least in part upon the plurality of conditional bids. In certain examples, the conditional bidding module 112 is further configured to transmit the target operator profile to the winning bidder.

In some examples, the conditional bidding module 112 is configured to collect, such as continually, management data of a target vehicle operator associated with the target operator profile. In certain examples, the conditional bidding module 112 is configured to determine whether each payment condition of the one or more payment conditions is satisfied based at least in part upon the user management data. In some examples, the one or more conditional payments includes a first conditional payment and a second conditional payment. In some examples, the one or more payment conditions includes a first payment condition and a second payment condition. In some examples, the first conditional payment is withheld from completion (e.g., transfer from winning bidder to telematics marketplace) at least until the first payment condition is satisfied. In some examples, the second conditional payment is withheld from completion (e.g., transfer from winning bidder to telematics marketplace) at least until the first payment condition and the second payment condition are satisfied.

In various examples, a payment condition may be bidding-related and may be satisfied when a bidder is selected as the winning bidder. In various examples, a payment condition may be data transmission-related and may be satisfied when a winning bidder receives the target operator profile that the bidder won. In various examples, a payment condition may be user acquisition-related and may be satisfied when the winning bidder successfully acquires a target vehicle operator associated with a target operator profile as a user (e.g., of a product of the winning bidder). In various examples, a payment condition may be user retention-related and may be satisfied when the winning bidder successfully retain a target vehicle operator associated with the target operator profile as a user beyond a target time duration. In various examples, a payment condition may be profitability-related and may be satisfied when the winning bidder successfully achieves a target profitability off from a target vehicle operator associated with the target operator profile as a user. For example, the target profitability may be set as a breakeven point where the cost of acquiring the user and/or is completely offset by profits generated by having the user as a customer.

In various embodiments, the system further includes a bid profit predictive module 114 configured to determine, for each bid of the plurality of conditional bids, a predicted bid-generated profit. In some examples, the bid profit predictive module 114 is configured to determine the winning bid as the bid which has the highest predicted bid-generated profit. In some examples, the bid profit predictive module 114 is configured to determine a predicted user retention duration. In some examples, the bid profit predictive module 114 is configured to determine the winning bid as the bid of the plurality of conditional bids which has the highest predicted long-term bid-generated profit for the full duration of the predicted user pretention duration. In some examples, the bid profit predictive module 114 is configured to determine the winning bid as the bid of the plurality of conditional bids which has the highest predicted period-specific bid-generated profit for a period of interest predetermined by a marketplace entity. In some examples, the bid profit predictive module 114 is configured to determine, for each payment condition of the one or more payment conditions, a likelihood of condition fulfillment. In some examples, the bid profit predictive module 114 is configured to assign, for each payment condition of the one or more payment conditions, a weight modifier. In various examples, the bid profit predictive module 114 is configured to assign a higher weight for conditions that are early (e.g., closer to the bidding process in time) and a lower weight for conditions that are late (e.g., farther from the bidding process in time).

In some examples, the bid profit predictive module 114 is configured to determine a predicted bid-generated revenue and a predicted bid-generated costs. In some examples, the bid profit predictive module 114 is configured to determine a predicted bid-generated revenue by at least multiplying, for each payment condition of the one or more payment conditions, the likelihood of success, the weight modifier, and an associated conditional payment, and summing up the products of the multiplications. In some examples, the bid profit predictive module 114 is configured to determine the winning bid to be the bid that has the highest predicted bid-generated revenue. In some examples, the bid profit predictive module 114 is configured to determine a predicted bid-generated costs for each payment condition of the one or more payment conditions. For example, a predicted bid-generated costs may include a predicted verification cost associated with verifying whether a condition has been satisfied and/or a predicted management cost associated with collecting, storing, and/or processing of user management data. In some examples, the bid profit predictive module 114 is configured to determine a predicted bid-generated profit by subtracting the predicted bid-generated revenue with the predicted bid-generated cost.

Figure 2:
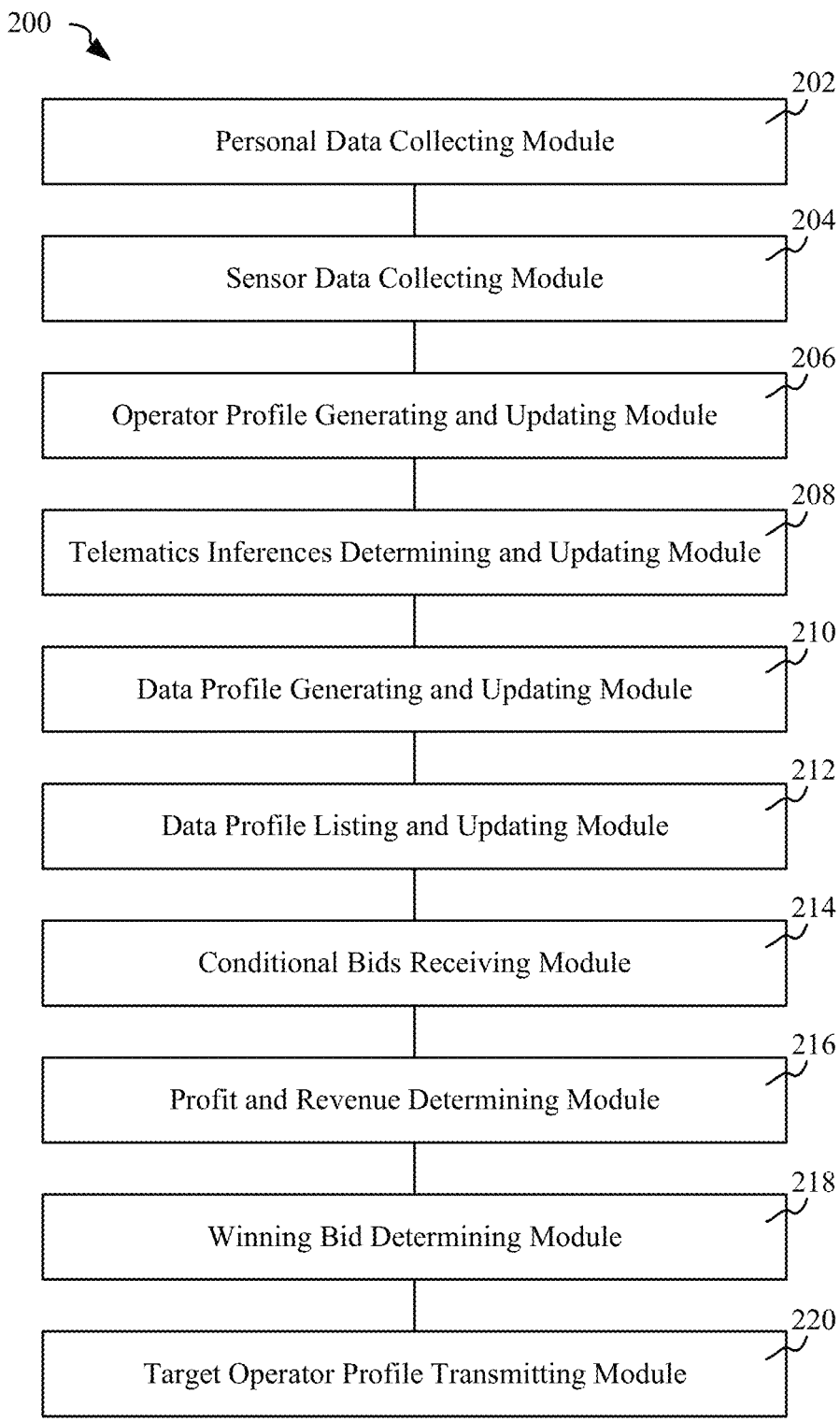
FIG. 2 is a simplified diagram showing a computing system for managing vehicle operator profiles based on telematics inferences via an auction telematics marketplace with bid profit prediction according to various embodiments of the present disclosure.

One or More Systems for Managing Vehicle Operator Profiles Based on Telematics Inferences Via an Auction Telematics Marketplace with Bid Profit Predicting According to Various Embodiments FIG. 2 is a simplified diagram showing a system 200 for data management using bid profit predicting, according to various embodiments of the present disclosure. This figure is merely an example, which should not unduly limit the scope of the claims. One of ordinary skill in the art would recognize many variations, alternatives, and modifications. In some examples, the system 200 includes a personal data collecting module 202, a sensor data collecting module 204, an operator profile generating and updating module 206, a telematics inferences determining and updating module 208, a data profile generating and updating module 210, a data profile listing and updating module 212, a conditional bids receiving module 214, a profit and revenue determining module 216, a winning bid determining module 218, and a target operator profile transmitting module 218. In certain examples, the system 200 is configured to implement method 300 of FIG. 3. In various examples, the system 200 includes one or more processors and a memory storing instructions that, upon execution by the one or more processors, cause the computing system to perform one or more processes including one or more processes of method 300. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the personal data collecting module 202 is configured to collect a plurality of personal data sets associated with a plurality of vehicle operators continually. In some examples, personal data set is collected via one or more marketplace participants. In some examples, the one or more marketplace participants includes an insurance company, a car rental company, a vehicle manufacturing company, an autonomous driving firm, a shared ride company, a housing firm, a bank, and/or a government agency. In some examples, the personal data includes vehicle operator-answered questionnaire data, application-usage data, device-usage data, internet-browsing data, or government data. In some examples, personal data include name, age, sex, gender, vehicle operation history, geolocation, occupation, financial data, homeownership data, credit score, personal preferences, and/or personal values.

In various embodiments, the sensor data collecting module 204 is configured to collect a plurality of sensor data sets associated with the plurality of vehicle operators continually via one or more sensing modules. In some examples, the one or more sensing modules includes a common module used by a plurality of mobile applications. In some examples, the common module is a software module. In some examples, the common module is a common hardware module. In some examples, each vehicle operator, such as of a plurality of vehicle operators, uses at least one mobile application of the plurality of mobile applications. In some examples, the plurality of mobile applications includes a system software application, an entertainment software application, a gaming software application, a navigation software application, and/or an environment software application.

In various embodiments, the operator profile generating and updating module 206 is configured to generate and continually update, such as for each vehicle operator of a plurality of vehicle operators, an operator profile including the personal data set associated with the vehicle operator.

In various embodiments, the telematics inferences determining and updating module 208 is configured to determine and/or update, such as continually and/or for each vehicle operator of a plurality of vehicle operators, one or more telematics inferences, such as based at least in part upon the sensor data set associated with the vehicle operator. In some examples, the telematics inferences determining and updating module 208 is configured to determine and/or update, such as continually and/or for each vehicle operator of a plurality of vehicle operators, one or more telematics inferences, such as based at least in part upon the sensor data set and the personal data set associated with the vehicle operator. In some examples, the telematics inferences determining and updating module 208 is configured to determine and/or update, such as continually, a predicted profitability based at least in part upon the associated continually received personal data set and/or the associated continually received sensor data set. In some examples, the telematics inferences determining and updating module 208 is configured to determine and/or update, such as continually, the predicted profitability using a predictive model, such as using a predictive model having a plurality of weights and biases that correspond to the importance of each type of sensor data in the determination of the predicted profitability. In some examples, the telematics inferences determining and updating module 208 is configured to determine and/or update, such as continually, a predicted costs and/or a predicted revenue based at least in part upon the associated continually received personal data set and/or the associated continually received sensor data set. In some examples, the one or more predictive models includes a predictive revenue model, a predictive costs model, a predictive losses model, and/or a predictive expenses model. In some examples, the one or more telematics inferences includes a profitability score, a reliability score, a financial stability score, a financial reliability score, a demographic score, a mobility score, a predicted risk score, a predicted costs score, a predicted retention score, and/or a payment reliability score.

In various embodiments, the data profile generating and updating module 210 is configured to generate and continually update a data profile including the one or more telematics inferences associated with the vehicle operator. In some examples, the data profile includes the associated personal data set and/or sensor data set. In some examples, personal data include name, age, sex, gender, vehicle operation history, geolocation, occupation, financial data, homeownership data, credit score, personal preferences, and/or personal values.

In various embodiments, the data profile listing and updating module 212 is configured to list and continually update the data profile onto a telematics marketplace, such as to be accessible by a plurality of marketplace participants.

In various embodiments, the bid receiving module 214 is configured to receive, such as from a plurality of bidders who are marketplace participants (e.g., marketplace consumers), a plurality of conditional bids for a target operator profile associated with a target data profile. In some examples, the target data profile may be selected from a list of listed data profiles on the telematics marketplace. In certain examples, each listed data profile corresponds to a vehicle operator. In some examples, each conditional bid includes one or more conditional payments and associated one or more payment conditions. In various examples, a payment condition may be bidding-related and may be satisfied when a bidder is selected as the winning bidder. In various examples, a payment condition may be data transmission-related and may be satisfied when a winning bidder receives the target operator profile that the bidder won. In various examples, a payment condition may be user acquisition-related and may be satisfied when the winning bidder successfully acquires a target vehicle operator associated with a target operator profile as a user (e.g., of a product of the winning bidder). In various examples, a payment condition may be user retention-related and may be satisfied when the winning bidder successfully retain a target vehicle operator associated with the target operator profile as a user beyond a target time duration. In various examples, a payment condition may be profitability-related and may be satisfied when the winning bidder successfully achieves a target profitability off from a target vehicle operator associated with the target operator profile as a user. For example, the target profitability may be set as a breakeven point where the cost of acquiring the user and/or is completely offset by profits generated by having the user as a customer.

In various embodiments, the profit and revenue determining module 216 is configured to determine, for each bid of the plurality of conditional bids, a predicted bid-generated profit. In some examples, the profit and revenue determining module 216 is configured to determine a predicted user retention duration. In some examples, the profit and revenue determining module 216 is configured to determine, for each payment condition of the one or more payment conditions, a likelihood of condition fulfillment. In some examples, the profit and revenue determining module 216 is configured to assign, for each payment condition of the one or more payment conditions, a weight modifier. In various examples, the profit and revenue determining module 216 is configured to assign a higher weight for conditions that are early (e.g., closer to the bidding process in time) and a lower weight for conditions that are late (e.g., farther from the bidding process in time).

In some examples, the profit and revenue determining module 216 is configured to determine a predicted bid-generated revenue and a predicted bid-generated costs. In some examples, the profit and revenue determining module 216 is configured to determine a predicted bid-generated revenue by at least multiplying, for each payment condition of the one or more payment conditions, the likelihood of success, the weight modifier, and an associated conditional payment, and summing up the products of the multiplications. In some examples, the profit and revenue determining module 216 is configured to determine a predicted bid-generated costs for each payment condition of the one or more payment conditions. For example, a predicted bid-generated costs may include a predicted verification cost associated with verifying whether a condition has been satisfied and/or a predicted management cost associated with collecting, storing, and/or processing of user management data. In some examples, the profit and revenue determining module 216 is configured to determine a predicted bid-generated profit by subtracting the predicted bid-generated revenue with the predicted bid-generated cost.

In various embodiments, the winning bid determining module 218 is configured to determine a winning bid and an associated winning bidder based at least in part upon the plurality of conditional bids. In some examples, the winning bid determining module 218 is configured to determine the winning bid as the bid which has the highest predicted bid-generated profit. In some examples, the winning bid determining module 218 is configured to determine the winning bid as the bid of the plurality of conditional bids which has the highest predicted long-term bid-generated profit for the full duration of the predicted user pretention duration. In some examples, the winning bid determining module 218 is configured to determine the winning bid as the bid of the plurality of conditional bids which has the highest predicted period-specific bid-generated profit for a period of interest predetermined by a marketplace entity. In some examples, the winning bid determining module 218 is configured to determine the winning bid to be the bid that has the highest predicted bid-generated revenue.

In various embodiments, the target operator profile transmitting module 220 is configured to transmit the target operator profile to the winning bidder.

In some examples, the system 200 is further configured to collect, such as continually, management data of a target vehicle operator associated with the target operator profile. In certain examples, the system 200 is configured to determine whether each payment condition of the one or more payment conditions is satisfied based at least in part upon the user management data. In some examples, the one or more conditional payments includes a first conditional payment and a second conditional payment. In some examples, the one or more payment conditions includes a first payment condition and a second payment condition. In some examples, the first conditional payment is withheld from completion (e.g., transfer from winning bidder to telematics marketplace) at least until the first payment condition is satisfied. In some examples, the second conditional payment is withheld from completion (e.g., transfer from winning bidder to telematics marketplace) at least until the first payment condition and the second payment condition are satisfied.

Figure 3:
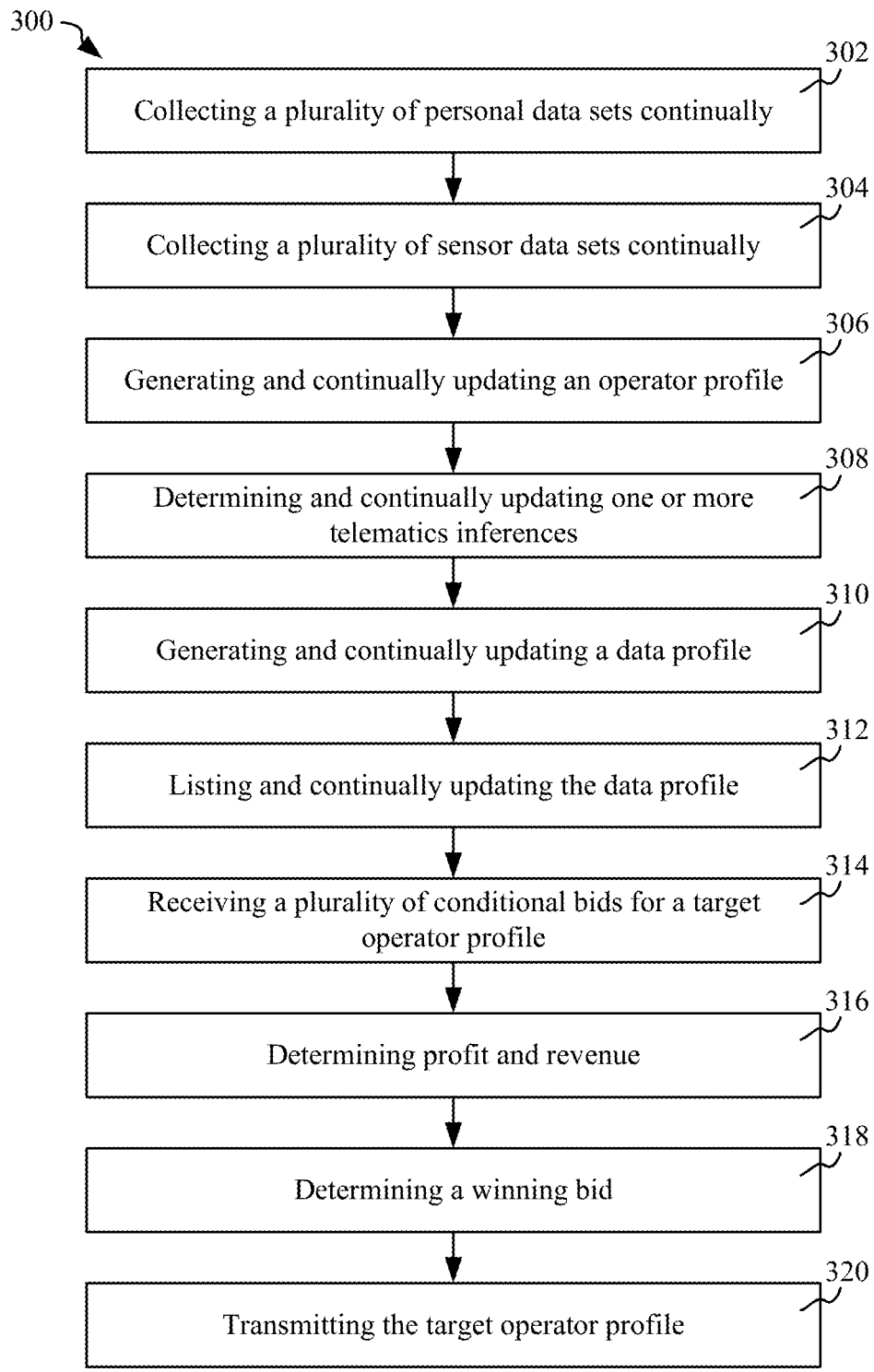
FIG. 3 is a simplified diagram showing a computer-implemented method for managing vehicle operator profiles based on telematics inferences via an auction telematics marketplace with bid profit prediction according to various embodiments of the present disclosure.

One or More Methods for Managing Vehicle Operator Profiles Based on Telematics Inferences Via an Auction Telematics Marketplace with Bid Profit Predicting According to Various Embodiments FIG. 3 is a simplified method 300 for data management using conditional bidding, according to various embodiments of the present disclosure. This figure is merely an example, which should not unduly limit the scope of the claims. One of ordinary skill in the art would recognize many variations, alternatives, and modifications. The method 300 includes a process a process 302 of collecting a plurality of personal data sets continually, a process 304 of collecting a plurality of sensor data sets continually, a process 306 of generating and continually updating an operator profile, a process 308 of determining and continually updating one or more telematics inferences, a process 310 of generating and continually updating a data profile, a process 312 of listing and continually updating the data profile onto a telematics marketplace, a process 314 of receiving a plurality of bids for a target operator profile, a process 316 of determining profit and revenue, a process 318 of determining a winning bid, and a process 320 of transmitting the target operator profile according to award protocols. In certain examples, the method 300 is configured to be implemented by system 200 of FIG. 2. Although the above has been shown using a selected group of processes for the method, there can be many alternatives, modifications, and variations. In some examples, some of the processes may be expanded and/or combined. Other processes may be inserted to those noted above. Depending upon the embodiment, the sequence of processes may be interchanged with others replaced. In some examples, some or all processes of the method are performed by a computing system or a processor directed by instructions stored in memory. As an example, some or all processes of the method are performed according to instructions stored in a non-transitory computer-readable medium.

In various embodiments, the process 302 of collecting a plurality of personal data sets continually includes collecting a plurality of personal data sets associated with a plurality of vehicle operators continually. In some examples, the personal data set includes vehicle operator-answered questionnaire data, application-usage data, device-usage data, internet-browsing data, and/or government data. In some examples, personal data include name, age, sex, gender, vehicle operation history, geolocation, occupation, financial data, homeownership data, credit score, personal preferences, and/or personal values.

In various embodiments, the process 304 of collecting a plurality of sensor data sets continually includes collecting a plurality of sensor data sets associated with the plurality of vehicle operators continually via one or more sensing modules. In some examples, the one or more sensing modules includes a common module used by a plurality of mobile applications. In some examples, the common module is a software module or a common hardware module. In some examples, each vehicle operator uses at least one mobile application of the plurality of mobile applications. In some examples, the plurality of mobile applications includes a system software application, an entertainment software application, a gaming software application, a navigation software application, and/or an environment software application.

In various embodiments, the process 306 of generating and continually updating an operator profile includes generating and continually updating, such as for each vehicle operator of the plurality of vehicle operators, an operator profile including the personal data set associated with the vehicle operator.

In various embodiments, the process 308 of determining and continually updating one or more telematics inferences includes determining and continually updating, such as for each vehicle operator of the plurality of vehicle operators, one or more telematics inferences based at least in part upon the sensor data set associated with the vehicle operator. In some examples, the process 308 of determining and continually updating one or more telematics inferences includes determining and continually updating a predicted profitability based at least in part upon the associated continually received personal data set and the associated continually received sensor data set. In some examples, the determining and continually updating the predicted profitability includes determining and continually updating the predicted profitability using a predictive model having a plurality of weights and biases that correspond to the importance of each type of sensor data in the determination of the predicted profitability. In some examples, the determining and continually updating the predicted profitability includes determining and continually updating a predicted costs and a predicted revenue based at least in part upon the associated continually received personal data set and the associated continually received sensor data set. In some examples, the one or more telematics inferences includes a profitability score, a reliability score, a financial stability score, a financial reliability score, a demographic score, a mobility score, a predicted risk score, a predicted costs score, a predicted retention score, and/or a payment reliability score.

In various embodiments, the process 310 of generating and continually updating, such as for each vehicle operator of the plurality of vehicle operators, a data profile includes generating and continually updating a data profile including the one or more telematics inferences associated with the vehicle operator.

In various embodiments, the process 312 of listing and continually updating, such as for each vehicle operator of the plurality of vehicle operators, the data profile onto a telematics marketplace includes listing and continually updating the data profile onto a telematics marketplace to be accessible by a plurality of marketplace participants. In some examples, the plurality of marketplace participants includes an insurance company, a car rental company, a vehicle manufacturing company, an autonomous driving firm, a shared ride company, a housing firm, a bank, and/or a government agency.

In various embodiments, the process 314 of receiving a plurality of conditional bids for a target operator profile includes receiving, such as from a plurality of bidders who are marketplace participants (e.g., marketplace consumers), a plurality of conditional bids for a target operator profile associated with a target data profile. In some examples, the target data profile may be selected from a list of listed data profiles on the telematics marketplace. In certain examples, each listed data profile corresponds to a vehicle operator. In some examples, each conditional bid includes one or more conditional payments and associated one or more payment conditions. In various examples, a payment condition may be bidding-related and may be satisfied when a bidder is selected as the winning bidder. In various examples, a payment condition may be data transmission-related and may be satisfied when a winning bidder receives the target operator profile that the bidder won. In various examples, a payment condition may be user acquisition-related and may be satisfied when the winning bidder successfully acquires a target vehicle operator associated with a target operator profile as a user (e.g., of a product of the winning bidder). In various examples, a payment condition may be user retention-related and may be satisfied when the winning bidder successfully retain a target vehicle operator associated with the target operator profile as a user beyond a target time duration. In various examples, a payment condition may be profitability-related and may be satisfied when the winning bidder successfully achieves a target profitability off from a target vehicle operator associated with the target operator profile as a user. For example, the target profitability may be set as a breakeven point where the cost of acquiring the user and/or is completely offset by profits generated by having the user as a customer.

In various embodiments, the process 316 of determining profit and revenue includes determining, for each bid of the plurality of conditional bids, a predicted bid-generated profit. In some examples, the process 316 of determining profit and revenue includes determining a predicted user retention duration. In some examples, the process 316 of determining profit and revenue includes determining, for each payment condition of the one or more payment conditions, a likelihood of condition fulfillment. In some examples, the process 316 of determining profit and revenue includes assigning, for each payment condition of the one or more payment conditions, a weight modifier. In various examples, the process 316 of determining profit and revenue includes assigning a higher weight for conditions that are early (e.g., closer to the bidding process in time) and a lower weight for conditions that are late (e.g., farther from the bidding process in time).

In some examples, the process 316 of determining profit and revenue includes determining a predicted bid-generated revenue and a predicted bid-generated costs. In some examples, the process 316 of determining profit and revenue includes determining a predicted bid-generated revenue by at least multiplying, for each payment condition of the one or more payment conditions, the likelihood of success, the weight modifier, and an associated conditional payment, and summing up the products of the multiplications. In some examples, the process 316 of determining profit and revenue includes determining a predicted bid-generated costs for each payment condition of the one or more payment conditions. For example, a predicted bid-generated costs may include a predicted verification cost associated with verifying whether a condition has been satisfied and/or a predicted management cost associated with collecting, storing, and/or processing of user management data. In some examples, the process 316 of determining profit and revenue includes determining a predicted bid-generated profit by subtracting the predicted bid-generated revenue with the predicted bid-generated cost.

In various embodiments, the process 318 of determining a winning bid includes determining a winning bid and an associated winning bidder based at least in part upon the plurality of conditional bids. In some examples, the process 318 of determining a winning bid includes determining the winning bid as the bid which has the highest predicted bid-generated profit. In some examples, the process 318 of determining a winning bid includes determining the winning bid as the bid of the plurality of conditional bids which has the highest predicted long-term bid-generated profit for the full duration of the predicted user pretention duration. In some examples, the process 318 of determining a winning bid includes determining the winning bid as the bid of the plurality of conditional bids which has the highest predicted period-specific bid-generated profit for a period of interest predetermined by a marketplace entity. In some examples, the process 318 of determining a winning bid includes determining the winning bid to be the bid that has the highest predicted bid-generated revenue.

In various embodiments, the process 320 of transmitting the target operator profile includes transmitting the target operator profile to the winning bidder.

In some examples, the method 300 further includes collecting, such as continually, management data of a target vehicle operator associated with the target operator profile. In certain examples, the method 300 further includes determining whether each payment condition of the one or more payment conditions is satisfied based at least in part upon the user management data. In some examples, the one or more conditional payments includes a first conditional payment and a second conditional payment. In some examples, the one or more payment conditions includes a first payment condition and a second payment condition. In some examples, the first conditional payment is withheld from completion (e.g., transfer from winning bidder to telematics marketplace) at least until the first payment condition is satisfied. In some examples, the second conditional payment is withheld from completion (e.g., transfer from winning bidder to telematics marketplace) at least until the first payment condition and the second payment condition are satisfied.

One or More Computer Devices According to Various Embodiments

Figure 4:
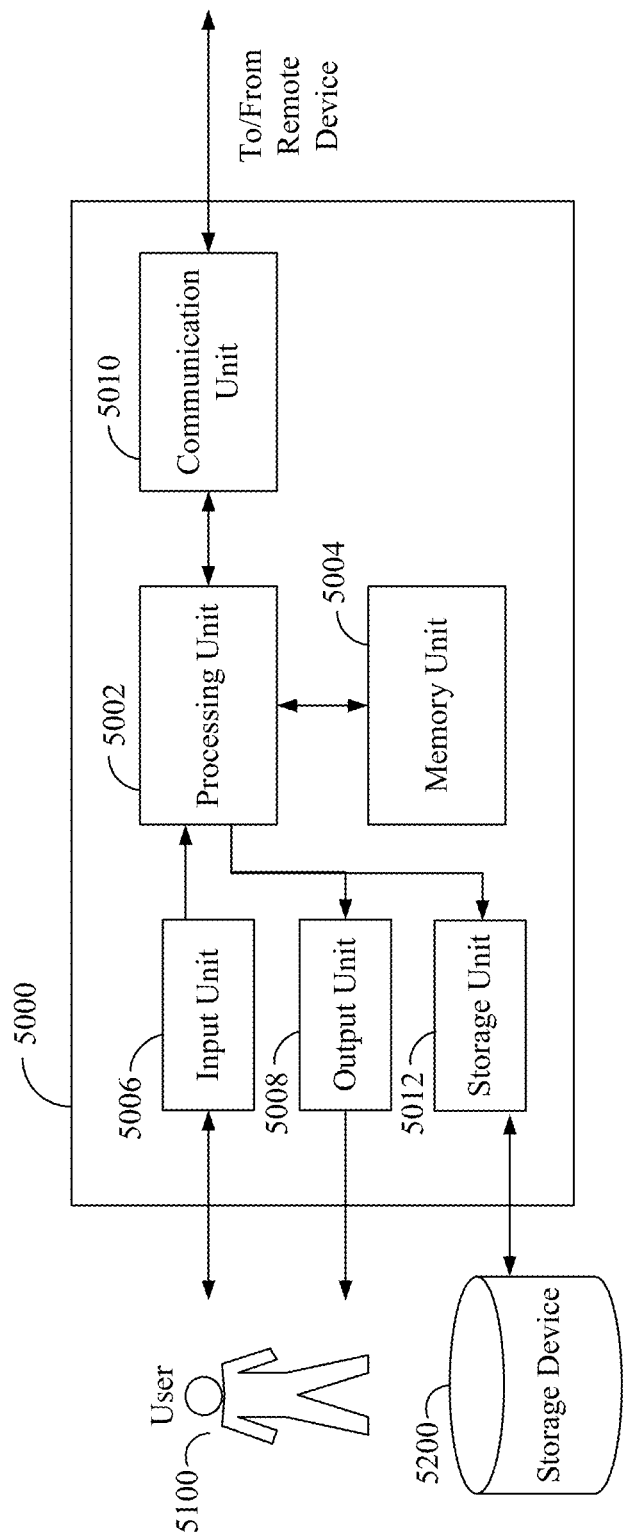
FIG. 4 is a simplified diagram showing a computer device, according to various embodiments of the present disclosure.

FIG. 4 is a simplified diagram showing a computer device 5000, according to various embodiments of the present disclosure. This figure is merely an example, which should not unduly limit the scope of the claims. One of ordinary skill in the art would recognize many variations, alternatives, and modifications. In some examples, the computer device 5000 includes a processing unit 5002, a memory unit 5004, an input unit 5006, an output unit 5008, and a communication unit 5010. In various examples, the computer device 5000 is configured to be in communication with a user 5100 and/or a storage device 5200. In certain examples, the system computer device 5000 is configured according to system 200 of FIG. 2 and/or to implement method 300 of FIG. 3. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the processing unit 5002 is configured for executing instructions, such as instructions to implement method 300 of FIG. 3. In some embodiments, executable instructions may be stored in the memory unit 5004. In some examples, the processing unit 5002 includes one or more processing units (e.g., in a multi-core configuration). In certain examples, the processing unit 5002 includes and/or is communicatively coupled to one or more modules for implementing the systems and methods described in the present disclosure. In some examples, the processing unit 5002 is configured to execute instructions within one or more operating systems, such as UNIX, LINUX, Microsoft Windows®, etc. In certain examples, upon initiation of a computer-implemented method, one or more instructions is executed during initialization. In some examples, one or more operations is executed to perform one or more processes described herein. In certain examples, an operation may be general or specific to a particular programming language (e.g., C, C#, C++, Java, or other suitable programming languages, etc.). In various examples, the processing unit 5002 is configured to be operatively coupled to the storage device 5200, such as via an on-board storage unit 5012.

In various embodiments, the memory unit 5004 includes a device allowing information, such as executable instructions and/or other data to be stored and retrieved. In some examples, memory unit 5004 includes one or more computer readable media. In some embodiments, stored in memory unit 5004 include computer readable instructions for providing a user interface, such as to the user 5004, via the output unit 5008. In some examples, a user interface includes a web browser and/or a client application. In various examples, a web browser enables one or more users, such as the user 5004, to display and/or interact with media and/or other information embedded on a web page and/or a website. In certain examples, the memory unit 5004 include computer readable instructions for receiving and processing an input, such as from the user 5004, via the input unit 5006. In certain examples, the memory unit 5004 includes random access memory (RAM) such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAN).

In various embodiments, the input unit 5006 is configured to receive input, such as from the user 5004. In some examples, the input unit 5006 includes a keyboard, a pointing device, a mouse, a stylus, a touch sensitive panel (e.g., a touch pad or a touch screen), a gyroscope, an accelerometer, a position detector (e.g., a Global Positioning System), and/or an audio input device. In certain examples, the input unit 5006, such as a touch screen of the input unit, is configured to function as both the input unit and the output unit.

In various embodiments, the output unit 5008 includes a media output unit configured to present information to the user 5004. In some embodiments, the output unit 5008 includes any component capable of conveying information to the user 5004. In certain embodiments, the output unit 5008 includes an output adapter, such as a video adapter and/or an audio adapter. In various examples, the output unit 5008, such as an output adapter of the output unit, is operatively coupled to the processing unit 5002 and/or operatively coupled to an presenting device configured to present the information to the user, such as via a visual display device (e.g., a liquid crystal display (LCD), a light emitting diode (LED) display, an organic light emitting diode (OLED) display, a cathode ray tube (CRT) display, an "electronic ink" display, a projected display, etc.) or an audio display device (e.g., a speaker arrangement or headphones).

In various embodiments, the communication unit 5010 is configured to be communicatively coupled to a remote device. In some examples, the communication unit 5010 includes a wired network adapter, a wireless network adapter, a wireless data transceiver for use with a mobile phone network (e.g., Global System for Mobile communications (GSM), 3G, 4G, 5G, NFC, or Bluetooth), and/or other mobile data networks (e.g., Worldwide Interoperability for Microwave Access (WIMAX)). In certain examples, other types of short-range or long-range networks may be used. In some examples, the communication unit 5010 is configured to provide email integration for communicating data between a server and one or more clients.

In various embodiments, the storage unit 5012 is configured to enable communication between the computer device 5000, such as via the processing unit 5002, and an external storage device 5200. In some examples, the storage unit 5012 is a storage interface. In certain examples, the storage interface is any component capable of providing the processing unit 5002 with access to the storage device 5200. In various examples, the storage unit 5012 includes an Advanced Technology Attachment (ATA) adapter, a Serial ATA (SATA) adapter, a Small Computing system Interface (SCSI) adapter, a RAID controller, a SAN adapter, a network adapter, and/or any other component capable of providing the processing unit 5002 with access to the storage device 5200.

In some examples, the storage device 5200 includes any computer-operated hardware suitable for storing and/or retrieving data. In certain examples, storage device 5200 is integrated in the computer device 5000. In some examples, the storage device 5200 includes a database, such as a local database or a cloud database. In certain examples, the storage device 5200 includes one or more hard disk drives. In various examples, the storage device is external and is configured to be accessed by a plurality of server systems. In certain examples, the storage device includes multiple storage units such as hard disks or solid state disks in a redundant array of inexpensive disks (RAID) configuration. In some examples, the storage device 5200 includes a storage area network (SAN) and/or a network attached storage (NAS) system.

One or More Computing Systems According to Various Embodiments

Figure 5:
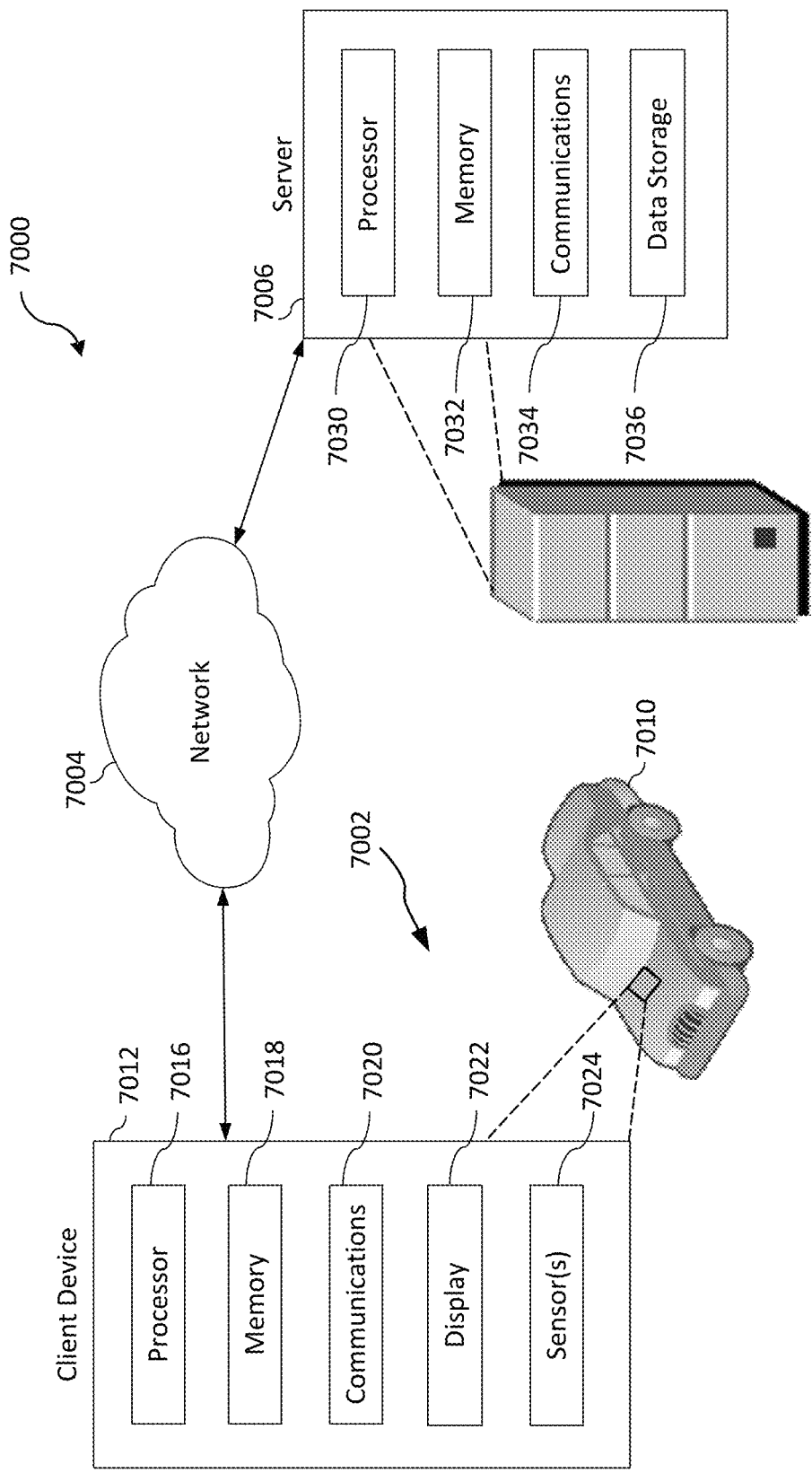
FIG. 5 is a simplified diagram showing a computing system, according to various embodiments of the present disclosure.

FIG. 5 is a simplified computing system 7000 according to various embodiments of the present disclosure. This figure is merely an example, which should not unduly limit the scope of the claims. One of ordinary skill in the art would recognize many variations, alternatives, and modifications. In some examples, the system 7000 includes a vehicle system 7002, a network 7004, and a server 7006. In certain examples, the system 7000, the vehicle system 7002, and/or the server 7006 is configured according to system 200 of FIG. 2 and/or to implement method 300 of FIG. 3. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the vehicle system 7002 includes a vehicle 7010 and a client device 7012 associated with the vehicle 7010. In various examples, the client device 7012 is an on-board computer embedded or located in the vehicle 7010. As an example, the client device 7012 is a mobile device (e.g., a smartphone) that is connected (e.g., via a wired connection or a wireless connection) to the vehicle 7010. In some examples, the client device 7012 includes a processor 7016 (e.g., a central processing unit (CPU), and/or a graphics processing unit (GPU)), a memory 7018 (e.g., storage unit, random-access memory (RAM), and/or read-only memory (ROM), flash memory), a communications unit 7020 (e.g., a network transceiver), a display unit 7022 (e.g., a touchscreen), and one or more sensors 7024 (e.g., an accelerometer, a gyroscope, a magnetometer, and/or a GPS sensor).

In various embodiments, the vehicle 7010 is operated by a user. In certain embodiments, the system 7000 includes multiple vehicles 7010, each vehicle of the multiple vehicles operated by a respective user of multiple users. In various examples, the one or more sensors 7024 monitors, during one or more vehicle trips, the vehicle 7010 by at least collecting data associated with one or more operating parameters of the vehicle, such as speed, speeding, braking, location, engine status, and/or other suitable parameters. In certain examples, the collected data include vehicle telematics data. According to some embodiments, the data are collected continuously, at predetermined time intervals, and/or based on one or more triggering events (e.g., when a sensor has acquired measurements greater than a threshold amount of sensor measurements). In various examples, the data collected by the one or more sensors 7024 correspond to user driving data, which may correspond to a driver's driving behaviors, in the methods and/or systems of the present disclosure.

According to various embodiments, the collected data are stored in the memory 7018 before being transmitted to the server 7006 using the communications unit 7020 via the network 7004 (e.g., via a local area network (LAN), a wide area network (WAN), or the Internet). In some examples, the collected data are transmitted directly to the server 7006 via the network 7004. In certain examples, the collected data are transmitted to the server 7006 via a third party. In some examples, a data monitoring system, managed or operated by a third party, is configured to store data collected by the one or more sensors 7024 and to transmit such data to the server 7006 via the network 7004 or a different network.

According to various embodiments, the server 7006 includes a processor 7030 (e.g., a microprocessor, a microcontroller), a memory 7032 (e.g., a storage unit), a communications unit 7034 (e.g., a network transceiver), and a data storage 7036 (e.g., one or more databases). In some examples, the server 7006 is a single server, while in certain embodiments, the server 7006 includes a plurality of servers with distributed processing and/or storage. In certain examples, the data storage 7036 is part of the server 7006, such as coupled via a network (e.g., the network 7004). In some examples, data, such as processed data and/or results, may be transmitted from the data storage, such as via the communications unit 7034, the network 7004, and/or the communications unit 7020, to the client device 7012, such as for display by the display 7022.

In some examples, the server 7006 includes various software applications stored in the memory 7032 and executable by the processor 7030. In some examples, these software applications include specific programs, routines, and/or scripts for performing functions associated with the methods of the present disclosure. In certain examples, the software applications include general-purpose software applications for data processing, network communication, database management, web server operation, and/or other functions typically performed by a server. In various examples, the server 7006 is configured to receive, such as via the network 7004 and via the communications unit 7034, the data collected by the one or more sensors 7024 from the client device 7012, and stores the data in the data storage 7036. In some examples, the server 7006 is further configured to process, via the processor 7030, the data to perform one or more processes of the methods of the present disclosure.

Examples of Certain Embodiments of the Present Disclosure

In various embodiments, systems and methods of the present disclosure provide a marketplace configured to automatically match a customer seeking insurance to one or more insurance policy offers based at least in part upon the customer's associated telematics data. In some examples, said telematics data are collected via a mobile device associated with the customer, such as via one or more software applications installed on the mobile device. In certain examples, the one or more software applications includes a system software application, an entertainment software application, a gaming software application, a navigation software application, and/or an environment software application. In various examples, telematics data of a first customer may be collected via a first selection of software application(s) from the one or more software applications, whereas telematics data of a second customer may be collected via a second selection of software application(s) from the one or more software applications. Telematics data collected via the first selection of software application(s) or the second selection of software application(s) may be used by the marketplace for automatically matching a policy offer to a customer.

In various embodiments, systems and methods of the present disclosure provide a marketplace configured to provide telematics data and/or inferences that are industry-specific, market-specific, and/or use-specific. Telematics inferences may include scores, ratings, insights, guidance and recommendation, and/or calculation results. For example, a user of the marketplace may be in the auto insurance industry and may receive auto-insurance-related score(s), rating(s), insight(s), recommendation(s), and/or calculation result(s) transmitted by the marketplace. The marketplace may determine the industry-specific score(s), rating(s), insight(s), recommendation(s), and/or calculation result(s) using one or more industry-specific algorithms, such as ones provided by the industry user(s). The industry-specific algorithms may include weights and biases that correspond to the importance of each type of telematics data associated with a plurality of vehicle operators. As another example, the user of the marketplace may be in the banking industry and may receive credit-worthiness score(s), rating (s), insight(s), recommendation(s), and/or calculation result (s) transmitted by the marketplace. The marketplace may determine the use-specific score(s), rating(s), insight(s), recommendation(s), and/or calculation result(s) using one or more use-specific algorithms, such as ones provided by the user(s) having a specific use. The use-specific algorithms may include weights and biases that correspond to the importance of each type of telematics data associated with a plurality of vehicle operators.

In various embodiments, systems and methods of the present disclosure collect telematics data associated with a plurality of vehicle operators using one or more software and/or hardware modules, such as of a software application installed on a portable device associated with each vehicle operator of the plurality of vehicle operators. In some examples, the plurality of vehicle operators may be users and/or clients of one or more insurance companies, one or more banks, one or more health insurers, one or more rental companies, one or more vehicle manufacturers, one or more ride-share companies, one or more housing firms, and/or one or more autonomous driving companies. In certain examples, each vehicle operator of the plurality of vehicle operators may be provided with the hardware module and/or software module configured to collect telematics data from an associated insurance company, an associated bank, an associated health insurer, an associated rental company, an associated vehicle manufacturer, an associated ride-share company, an associated housing firm, and/or an associated autonomous driving company.

In various embodiments, systems and methods of the present disclosure provide a universal marketplace for a plurality of users, a plurality of clients, a plurality of vehicle operators, a plurality of subscribers, and/or a plurality of members for collecting, scoring, storing, managing, and/or sharing telematics data and telematics-based inferences regarding the plurality of vehicle operators. In some examples, the systems and methods of the present disclosure provide the universal marketplace using continual, such as real-time or near-real-time, collecting of telematics data, determining of telematics-based inferences, and/or presenting of telematics data and/or telematics-based inferences. In other examples, the systems and methods of the present disclosure provide the universal marketplace using intermittent, such as by following a pre-determined scheduled, collecting of telematics data, determining of telematics-based inferences, and/or presenting of telematics data and/or telematics-based inferences.

In various embodiments, systems and methods of the present disclosure collect telematics data via a software development kit (SDK), such as via a common software development kit installed as part of a plurality of software applications. In various examples, each mobile device of a plurality of mobile devices (e.g., phones, vehicles, and/or portable units) of a plurality of vehicle operators may be loaded with one or more software applications of the plurality of software applications. Each software application of the one or more software applications may collect, via one or more hardware modules associated with a vehicle operated by the associated vehicle operator, one or more types of telematics data (e.g., acceleration, braking, cornering). In certain examples, the common SDK may configure a first software application to collect a first set of telematics data and configure a second software application to collect a second set of telematics data, where both the first set of telematics data and the second set of telematics data may be combined complimentarily to describe driving behaviors of a corresponding vehicle operator during a corresponding time period. In some examples, systems and methods of the present disclosure collects telematics data, such as via a plurality of software applications having a common SDK such that the telematics data collected are in standardized format(s) such that the marketplace may process the telematics data on a consistent basis. In some examples, a plurality of software applications may include a common SDK configured to enable background-location tracking, which when enabled, collects at least location-based telematics data for the associated vehicle operator(s).

In various embodiments, systems and methods of the present disclosure share and/or transmit information (e.g., telematics data, telematics-data-based inferences such as score(s), rating(s), insight(s), recommendation(s), and/or calculation result(s)) with marketplace participants (e.g., users, clients, and/or subscribers) in a standardized or universally accepted data format(s) and delivery protocol(s) (e.g., with one or more security features to ensure data security and/or privacy). As such, the information may be populated consistently to a plurality of marketplace participants of a plurality of industries having a plurality of uses for the data.

In various embodiments, systems and methods of the present disclosure provide a shared telematics data-based marketplace to be accessed, such as via a subscription or authentication requirement, by a plurality of marketplace participants. The plurality of marketplace participants may provide input data and/or algorithm(s) to the determining module(s) of the marketplace to obtain telematics-data-based inferences such as score(s), rating(s), insight(s), recommendation(s), and/or calculation result(s). In some examples, none or some or all of the input data provided by a marketplace participant are shared with none or some or all of the other marketplace participants of the plurality of marketplace participants. In some examples, none or some or all of the telematics-data-based inferences determined by the marketplace modules based on input data from a marketplace participant are shared with none or some or all of the other marketplace participants of the plurality of marketplace participants.

In various embodiments, systems and methods of the present disclosure provide a shared telematics data-based marketplace configured to collect telematics data, from a plurality of vehicle operators, using a plurality of software applications including a common SDK and further configured to share, with a plurality of marketplace participants, the telematics data and/or telematics-data-based inferences (e.g., score(s), rating(s), insight(s), recommendation(s), and/or calculation result(s)) determined based at least in part upon the telematics data.

In various embodiments, systems and methods of the present disclosure provide a telematics-data-based marketplace with a plurality of access levels. Each access level of the plurality of access levels may be associated with a privacy level and/or a security level such that a marketplace participant granted with such access level is protected against unwanted disclosure of certain telematics data and/or telematics data-based inferences. In some examples, a marketplace participant may select which access level it will allow, for part or all of its telematics data and/or telematics data-based inferences, other marketplace participants to access. For example, a marketplace participant may select an access level that requires other marketplace participants to acquire approval, such as via an authentication process or a transaction, before being allowed to access and/or use part of all of its telematics data available on the telematics-based marketplace. As another example, a marketplace participant may select a no-access access level that forbids any third party from accessing and/or using its telematics data available on the telematics-based marketplace. Such no-access access level may be desirable for marketplace participants whose clients or users chose to opt-out from data share or data sale.

In various embodiments, a marketplace participant is a marketplace supplier when it supplies telematics data and/or telematics-data-based inferences onto the marketplace. In various examples, a marketplace participant is a marketplace consumer when it access telematics data and/or telematics-data-based inferences available on the marketplace. In some examples, a marketplace participant can be both a marketplace supplier and a marketplace consumer. In certain examples, a marketplace supplier may select an access level to control access of its telematics data and/or telematics-data-based inferences by marketplace consumer(s) who desire access. In certain examples, a marketplace consumer may purchase an access level to gain access of a marketplace supplier's telematics data and/or telematics-data-based inferences. In some examples, a marketplace supplier may require a minimum access level for a marketplace consumer to have before allowing access to its telematics data and/or telematics-data-based inferences. In some examples, a marketplace supplier may set access restriction(s), such as access restriction(s) prohibiting marketplace consumer(s) of a particular industry. In certain examples, access restriction may prohibit particular competitors from access.

In various embodiments, systems and methods of the present disclosure provide a telematics-based marketplace, collect and make available telematics data associated with a plurality of vehicle operators, optionally generate telematics-data-based inferences, present telematics data and/or telematics-data-based inferences to one or more marketplace participants, and receive one or more requests for profile information associated with one or more interested vehicle operators of the plurality of vehicle operators based at least in part upon the telematics data and/or the telematics-data-based inferences. In some examples, the profile information requested are specific to one or more advertisements. In certain examples, the profile information are collected manually and/or automatically from vehicle operator(s), marketplace participant(s), and/or public database(s). For example, the marketplace and/or the marketplace participants may collect personal information via vehicle operator-answered questionnaires, application-usage data, device-usage data, internet-browsing data, and/or government agencies. In some examples, a vehicle operator may opt-out from permitting marketplace participants to upload and/or share his/her corresponding telematics data and/or personal data via the marketplace either in part or in full.

In various embodiments, systems and methods of the present disclosure collect telematics data associated with a plurality of vehicle operators continuously or intermittently such that the telematics data and/or the associated telematics-data-based inferences presented via the marketplace to a plurality of marketplace participants are up to date. In some examples, the marketplace collects telematics data of a vehicle operator before the vehicle operator becomes a user, customer, or client of a marketplace participant, while the vehicle operator is a user, customer, or client of the marketplace participant, and/or after the vehicle operator has stopped being a user, customer, or client of the marketplace participant. In various examples, the plurality of marketplace participants may monitor a vehicle operator via the telematics data and/or the associated telematics-data-based inferences on the marketplace to determine whether to extend a new service or discount, and/or adjust an existing service or an associated price.

In various embodiments, systems and methods of the present disclosure provide a telematics-based auction marketplace including one or more auction features and/or mechanisms. For example, systems and methods of the present disclosure provide a telematics-based auction marketplace configured to receive bids from a plurality of marketplace participants for one or more user profiles and the associated user information. In some examples, systems and methods of the present disclosure present telematics data and/or telematics data-based inferences to a plurality of marketplace participants such that the plurality of marketplace participants may determine whether to bid for a user based at least in part upon the user's associated telematics data and/or telematics data-based inferences. In certain examples, systems and methods of the present disclosure receive one or more bids from a plurality of marketplace participants automatically, continuously, and/or intermittently. For example, systems and methods of the present disclosure receive, such as via one or more software applications and/or hardware modules, new bid(s) and/or updated bid(s) for a vehicle operator's information whenever new information becomes available on the marketplace.

In various embodiments, systems and methods of the present disclosure provide a shared telematics-based marketplace and collect telematics data associated with a plurality of vehicle operators using one or more software applications and/or hardware modules. In various examples, the one or more software applications and/or hardware modules may be configured to perform a primary task other than to collect telematics data. For example, the primary task may be to provide a user environmental information (e.g., weather), to provide a user geolocational information and/or directions, to provide a user entertainment (e.g., gaming, music, movie, video), and/or to provide a user device information. In some examples, the one or more software applications and/or hardware modules may be provided to a vehicle operator by one or more marketplace participants. In certain examples, the one or more software applications and/or hardware modules may collect telematics data in universal format(s) and/or protocol(s) for improved interoperability.

In some examples, the one or more software applications and/or hardware modules may be provided by marketplace participants of the same industry. For example, systems and methods of the present disclosure provide a shared telematics-based marketplace and collect a first telematics data associated with a first vehicle operator using a first set of software applications and/or hardware modules, and collect a second telematics data associated with a second vehicle operator using a second set of software applications and/or hardware modules. The first set of software applications and/or hardware modules may be provided by a first marketplace participant whom the first vehicle operator has a relationship with (e.g., as a client, a customer, and/or a user). The second set of software applications and/or hardware modules may be provided by a second marketplace participant whom the second vehicle operator has a relationship with (e.g., as a client, a customer, and/or a user). Once collected, the marketplace may present the first telematics data, the second telematics data, and/or associated telematics data-based inference(s), to a plurality of marketplace participants (e.g., including the first marketplace participant and/or the second marketplace participant).

In various embodiments, systems and methods of the present disclosure provide a telematics-based marketplace for user information to a plurality of marketplace participants. In some examples, the telematics-based marketplace is provided as a universal portal or interface for the plurality of marketplace participants to request, share, and/or analyze telematics data and/or telematics-data-based inferences of one or more vehicle operators. For example, the telematics-based marketplace collects and presents, such as automatically, and/or continuously, telematics data and/or telematics-data-based inferences from a plurality of sources including one or more of the marketplace participants, public entities, and/or directly from devices associated with the vehicle operator(s).

In various embodiments, systems and methods of the present disclosure generate a score associated with each vehicle operator listed on the telematics-data-based marketplace. In various examples, the score is generated based at least in part upon the associated vehicle operator's sensor data. In some examples, the score is generated such that it represents or informs a risk of collision of the associated vehicle operator. In certain examples, the score is generated such that it represents or informs a predicted cost and/or profitability should a marketplace participant acquire or maintain the vehicle operator as a customer, user, or client. For example, the score may be a profitability score and may be generated as a ratio of predicted cost to policy premium. In some examples, the predicted costs is generated based at least in part upon the associated telematics data and/or additional personal data (e.g., financial data, geolocational data, health data, activity data). In certain examples, multiple profitability scores corresponding to multiple policy premium may be generated and presented to a marketplace participant to help the marketplace participant to determine which policy premium(s) would lead to a satisfactory profitability for the associated vehicle operator as a customer. This may help a marketplace participant to improve its pricing mechanism and/or profitability.

In various embodiments, systems and methods of the present disclosure generate, maintain, and update a score associated with each vehicle operator listed on the telematics-data-based marketplace using a residual model. In some examples, systems and methods of the present disclosure train and/or configure the residual model to determine an initial score for each vehicle operator based at least in part upon the telematics data collected prior to the listing of the vehicle operator onto the marketplace. In various examples, systems and methods of the present disclosure train and/or configure the residual model to further determine an updated score based at least in part upon the initial score and newly collected telematics data collected during one or more recent trips operated by the vehicle operator. In some examples, the residual model is trained, configured, maintained, and/or updated by one or more marketplace participants and/or by one or more marketplace non-participants, such as by a neutral entity providing the telematics-data-based marketplace.

In various examples, a universal predictive model may be insulated from marketplace participants such that formulas, weights, biases, and parameters are all determined and maintained by a neutral party and not by marketplace participant. Such universal predictive model may help maintain neutrality and avoid influence or control by the marketplace participants. In some examples, a universal predictive model is opaque to the marketplace participants such that the model functions similar to a black box in that the details of determinations and calculations are hidden to the marketplace participants. In various examples, the neutral party, such as a marketplace administrator, may modify and maintain the universal model according to marketplace participants' needs, but such change may only be suggested and not required by the marketplace participants to help maintain a fair marketplace. In some examples, the systems and methods of the present disclosure identify one or more use-specific modifications, one or more market-specific modifications, one or more industry-specific modifications, and/or one or more participant-specific modifications, such as based on user-acquisition data indicative of the success rates of user acquisition by marketplace participants. A universal predictive model may also be referred to as a party-neutral predictive model.

In various embodiments, systems and methods of the present disclosure generate one or more scores for each vehicle operator listed on the telematics-data-based marketplace based at least in part upon comparing the telematics data of the associated vehicle operator to the telematics data of one or more similar vehicle operators. In certain examples, systems and methods of the present disclosure train and/or configure the residual model to determine the initial score and/or the updated score based not only upon the telematics data of an associated vehicle operator, but also telematics data of a group of similar vehicle operators. For example, the residual model may be trained or configured to determine the initial score and/or the updated score as relative metric(s) indicative of relative operation performance(s) and/or characteristic(s) of a first vehicle operator in comparison to a group of similar vehicle operators. The relative metrics may be a ratio. As an example, a vehicle operator may be scored relative to its group of similar vehicle operators such that a predicted costs similar to that of the group of similar vehicle operators would result in a predicted relative costs close to unity. The group of similar vehicle operators may share similar geolocations, financial statuses, demographics, insurance providers, employers, and/or service providers. As an example, a first vehicle operator may drive similarly to a second vehicle operator but scored a higher score because the groups of similar vehicle operators to which the first and second vehicle operators are compared against exhibit different levels of driving characteristics. In various examples, a vehicle operator may be associated with multiple groups of similar vehicle operators and each relative metric may be determined relative to one or more of the multiple groups of similar vehicle operators. In certain examples, systems and methods of the present disclosure may determine industry-specific, market-specific, use-specific, and/or relative metrics of a vehicle operator based on one or more groups of similar vehicle operators to which the vehicle operator is associated.

In some examples, systems and methods of the present disclosure may determine the score for a vehicle operator based at least in part upon the associated telematics data and/or associated driving habits/patterns. For example, a better score may be determined for a vehicle operator who drives riskier but less frequent than other similar vehicle operators. In some examples, a better score may be determined for a first vehicle operator who has had more insurance claims than a second vehicle operator who has had no insurance claims, such as when the telematics data associated with the first vehicle operator indicate less risky driving behaviors when compared to the second vehicle operator. In various examples, systems and methods of the present disclosure may determine the score for a vehicle operator based not only on claim history but also on sensor data that are indicative of the vehicle operator's driving behaviors.

In various examples, systems and methods of the present disclosure may determine a loss ratio as the score based at least in part upon a vehicle operator's associated costs and policy premium paid throughout the policy term. In some examples, the loss ratio is presented to one or more marketplace participants, such as including the insurance company the vehicle operator has been insured with, to provide recommendation or guidance as to how to adjust pricing and/or policy to improve profitability of insuring this particular vehicle operator and/or others. As an example, a loss ratio that is less than 1 (e.g., 0.5) may prompt a marketplace participant to issue a premium discount to a vehicle operator, whereas a loss ratio that is more than 1 (e.g., 5) may prompt the marketplace participant to increase the policy premium.

In certain examples, the residual model used to determine the loss ratio may be trained to predict a predicted loss ratio. For example, systems and methods of the present disclosure may train the residual model, which may be a machine learning model, using telematics data and historic loss ratios associated with a plurality of vehicle operators. The plurality of vehicle operators may have been insured by the same or different insurance companies. Once trained, systems and methods of the present disclosure may determine, using the trained residual model, a predicted loss ratio for a vehicle operator based on the associated telematics data collected even when historic profitability data (e.g., associated costs and policy premium paid over the past certain time period) are unavailable. In some examples, systems and methods of the present disclosure determine the predicted profitability as a single metric to represent the desirability of a vehicle operator to a marketplace participant. The systems and methods of the present disclosure may configure and/or train the predictive model (e.g., a residual model) for determining the predicted profitability to consider telematics data, claim history, costs, premium payments, and/or additional user data.

In some examples, systems and methods of the present disclosure may determine an incremental loss ratio as the score based at least in part upon a vehicle operator's associated incremental costs and policy premium paid over the past certain time period (e.g., past season, past month, past week, or past day). In certain examples, incremental cost ratio may be determined by dividing the incremental costs incurred by premium payments received over the certain time period. In some examples, the incremental loss ratio is presented to one or more marketplace participants, such as including the insurance company the vehicle operator has been insured with, to provide recommendation or guidance as to how to adjust pricing and/or policy to improve profitability of insuring this particular vehicle operator and/or others. As an example, an incremental loss ratio that is less than 1 (e.g., 0.5) may prompt a marketplace participant to issue a premium discount to a vehicle operator, whereas an incremental loss ratio that is more than 1 (e.g., 5) may prompt the marketplace participant to increase the policy premium.

In certain examples, the residual model used to determine the incremental loss ratio may be trained to predict a predicted incremental loss ratio. For example, systems and methods of the present disclosure may train the residual model, which may be a machine learning model, using telematics data and historic incremental loss ratios associated with a plurality of vehicle operators. The plurality of vehicle operators may have been insured by the same or different insurance companies. Once trained, systems and methods of the present disclosure may determine, using the trained residual model, a predicted incremental loss ratio for a vehicle operator based on the associated telematics data collected even when historic profitability data (e.g., associated costs and policy premium paid over the past certain time period) are unavailable. In some examples, systems and methods of the present disclosure determine the predicted profitability as a single metric to represent the desirability of a vehicle operator to a marketplace participant. The systems and methods of the present disclosure may configure and/or train the predictive model (e.g., a residual model) for determining the predicted incremental profitability to consider telematics data, claim history, costs, premium payments, and/or additional user data.

In various embodiments, systems and methods of the present disclosure determine and/or present, for each vehicle operator of a plurality of operators listed on a telematics-based marketplace, one or more price-adjusted metrics to a plurality of marketplace participants. In some examples, the one or more price-adjusted metrics may provide pricing guidance to the plurality of marketplace participants to achieve a target profitability. In certain examples, the one or more price-adjusted metrics include a price-adjusted risk threshold, a price-adjusted performance threshold, a price-adjusted mileage threshold, and/or a price-adjusted cost threshold. In various examples, systems and methods of the present disclosure determine the one or more price-adjusted metrics based at least in part upon the telematics data associated with the plurality of operators. In certain examples, systems and methods of the present disclosure determine the one or more price-adjusted metrics using one or more residual models configured and/or trained for determining residual risk, performance threshold, mileage threshold, cost threshold, price-adjusted residual risk, price-adjusted performance threshold, price-adjusted mileage threshold, and/or price-adjusted cost threshold.

In various embodiments, systems and methods of the present disclosure configure and/or train one or more models to receive at least telematics data associated with a vehicle operator (e.g., collected via one or more software applications and/or hardware modules) as input and to generate a predicted cost associated with the vehicle operator. In some examples, the predicted cost includes predicted losses and predicted expenses over a predicted policy term (e.g., the time during which the vehicle operator is predicted to be a customer to a marketplace participant). In certain examples, the predicted losses are associated with one or more predicted claims that may occur during the predicted policy term. In some examples, the predicted losses include payouts for vehicle repairs, replacements, property damage payouts, and/or personal injury payouts. In various examples, the predicted expenses include costs of customer acquisition, costs of customer retention, telematics data collection costs, telematics data processing costs, costs of operation associated with the telematics-based marketplace, and/or costs of customer service. In some examples, the one or more models includes a loss model for determining predicted losses and an expense model for determining predicted expenses.

In various embodiments, systems and methods of the present disclosure configure and/or train one or more models to receive at least incremental telematics data (e.g., telematics data collected over a certain time period) associated with a vehicle operator (e.g., collected via one or more software applications and/or hardware modules) as input and to generate an predicted incremental cost associated with the vehicle operator. In some examples, the predicted incremental costs includes predicted incremental losses and predicted incremental expenses over a pre-determined time period (e.g., a fixed time period during which the vehicle operator is predicted to be a customer to a marketplace participant). In certain examples, the predicted incremental losses are associated with one or more predicted claims that may occur during the pre-determined time period. In some examples, the predicted incremental losses include payouts for vehicle repairs, replacements, property damage payouts, and/or personal injury payouts. In various examples, the predicted incremental expenses include costs of customer acquisition, costs of customer retention, telematics data collection costs, telematics data processing costs, costs of operation associated with the telematics-based marketplace, and/or costs of customer service. In some examples, the one or more models includes an incremental loss model for determining predicted incremental losses and an incremental expense model for determining predicted incremental expenses.

In some examples, systems and methods of the present disclosure collect, for each vehicle operator listed on the telematics-based marketplace, incremental telematics data, incremental costs, incremental expenses, and/or incremental losses. In certain examples, as more costs and/or expenses data are collected over an increasing length of periods of time for a plurality of vehicle operators, systems and methods of the present disclosure may configure and/or train the one or more models to predict one or more predicted trends, such as one or more predicted trends of one or more incremental metrics. In various examples, systems and methods of the present disclosure determine, for each vehicle operator listed on the telematics-based marketplace, a predicted profitability, based at least in part upon the predicted costs, a predicted risk, and/or a predicted retention period (e.g., how long a vehicle operator is predicted to remain a customer to a marketplace participant). In some examples, systems and methods of the present disclosure determine a predicted value associated with each vehicle operator based on the predicted profitability for an expected retention period.

In various embodiments, systems and methods of the present disclosure train and/or configure a predictive model for generating, based at least in part upon incremental telematics data and/or incremental costs, a predicted value associated with each vehicle operator listed on the telematics-based marketplace. In some examples, the predicted value generated for and presented to each marketplace participant may be the same or different. For example, the predicted value may be generated using an universal model (e.g., with a set biases, set weights, and/or formulas), where the same predicted value would be presented to the plurality of marketplace participants. In another example, the predicted value may be generated, for each marketplace participant, using a different party-specific model or a different use-specific model, where different predicted values may be presented to the plurality of marketplace participants.

In various embodiments, systems and methods of the present disclosure may generate telematics inferences based at least in part upon telematics data using an universal predictive model, such as one generated and maintained by the marketplace administrators.

In various embodiments, systems and methods of the present disclosure track, monitor, and/or determine, for each vehicle operator of a plurality of vehicle operators, an incremental profitability, an overall profitability, a predicted incremental profitability, and/or predicted overall profitability. For example, systems and methods of the present disclosure collect, such as continually, continuously, on set time points or periods, in real-time or in near real-time, telematics data and/or additional operator data (e.g., financial data, lifestyle data, social data, and/or online activity data) corresponding to one or more vehicle operators. The systems and methods of the present disclosure further generate, for each vehicle operator using one or more predictive models and the collected telematics data and/or additional operator data, incremental profitability and/or overall profitability. The incremental profitability may be an actual profitability and may be determined by subtracting value received over a time period by costs incurred during the time period and dividing the sum by the duration of the time period.

In various embodiments, systems and methods of the present disclosure provide a feedback associated with one or more vehicle operators to one or more marketplace participants. The one or more vehicle operators may be customers, clients, and/or users (e.g., trial users, subscribers, standard users, premium users) of the one or more marketplace participants. In some examples, systems and methods of the present disclosure may collect telematics data and/or additional operator data (e.g., financial data, lifestyle data, social data, and/or online activity data) at least from the one or more marketplace participants. The systems and methods of the present disclosure may further generate one or more desirability indices indicative of desirability of the one or more vehicle operators to the one or more marketplace participants. The one or more desirability indices may include an incremental profitability, an overall profitability, a predicted incremental profitability, and/or predicted overall profitability.

In some examples, systems and methods of the present disclosure may generate, such as based on telematics data available on the telematics-data-based marketplace, an initial predicted profitability when a vehicle operator first become a user of a marketplace participant. After becoming a user, systems and methods of the present disclosure may further generate a first subsequent profitability metric based at least in part upon telematics data collected during a first time period. After the first time period, systems and methods of the present disclosure may further generate a second subsequent profitability metric based at least in part upon telematics data collected during a second time period. In various examples, systems and methods of the present disclosure may determine, based on the subsequent profitability metrics, a match feedback (e.g., a score and/or trend) indicative of whether the vehicle operator matches, outperforms, or underperforms the initial predicted profitability.

In certain examples, for the initial time periods (e.g., days or weeks since a vehicle operator become a user of a marketplace participant), the match feedback is more likely to be "match" since telematics data in the early periods should not deviate much from telematics data available on the marketplace as they are more closely related. In contrast, for later time periods (e.g., months or years since a vehicle operator become a user of a marketplace participant), the match feedback is less likely to be "match" because the vehicle operator's operation habits may have evolved and would be manifested in a change in telematics data when compared to the early periods. In various embodiments, systems and methods of the present disclosure may present, such as continually and/or every time a new match feedback is generated, the match feedback to the marketplace participant such that the marketplace participant may evaluate whether the vehicle operator is and/or will be a desirable (e.g., profitable) user. In some examples, systems and methods of the present disclosure may train one or more predictive models for generating profitability metrics (e.g., including cost metrics) based at least in part upon the match feedback.

In various embodiments, systems and methods of the present disclosure determine one or more user-management metrices indicative associated with a vehicle operator who's a user of a marketplace participant. In certain examples, the one or more user-management metrices include actual costs of acquisition, actual costs of risk events, actual customer service expenses, actual costs of retention, probability of conversion at time of acquisition, probability of retention, probability of risk events, predicted costs of risk events, predicted customer service expenses, and/or predicted costs of retention. In some examples, systems and methods of the present disclosure determine one or more user-management metrices for each vehicle operator of a plurality of vehicle operators on the telematics-data-based marketplace and use said data to train one or more predictive models. In certain examples, systems and methods of the present disclosure may determine to the marketplace participant one or more predicted user-management metrices associated with a prospective user of the marketplace participant. In some examples, systems and methods of the present disclosure may present the one or more predicted user-management metrices to aid the marketplace participant to weigh the profitability of a vehicle operator against the associated costs and likelihood of conversion. In certain examples, systems and methods of the present disclosure may determine a cost-benefit score associated with each vehicle operator to a marketplace participant who's looking to acquire a user. In various examples, systems and methods of the present disclosure determine a retention recommendation based at least in part upon expected profitability of an associated vehicle operator.

In various embodiments, systems and methods of the present disclosure determine and present, such as for each vehicle operator on the telematics-data-based marketplace, a metric of expected profits and a metric of expected costs. In some examples, the metric of expected profits and metric of expected costs together are indicative of the potential value of a potential user or of a current user to one or more marketplace participant. In certain examples, the metric of expected profits and/or metric of expected costs are calculated individually for each marketplace participant, such as using party-specific algorithms and/or use-specific algorithms. In various examples, the systems and methods of the present disclosure may provide guidance to marketplace participants in modifying one or more predictive models for generating profitability and associated metrics, one or more models of user acquisition, one or more models of user retention, and/or one or more methods of collecting data associated with vehicle operators.

In various embodiments, systems and methods of the present disclosure present the metric of expected profits and/or metric of expected costs to all marketplace participants or to those who have requested such information. In some examples, systems and methods of the present disclosure present the metric of expected profits and/or metric of expected costs to only selected authenticated marketplace participants for the associated vehicle operators. In certain examples, the selected authenticated marketplace participants may be granted an access key associated with a selection of vehicle operators that enables access to some or all of determined metrics of expected profits and/or metrics of expected costs. In various examples, such access key may be termed, may be renewed, may be terminated, such as at the discretion of an originating marketplace participant (to whom the vehicle operator is a user of), the vehicle operator, a marketplace administrator, or a third-party. In certain examples, systems and methods of the present disclosure train a predictive model for generating a metric of expected profits for a prospective user based at least in part upon a plurality of metrics of actual profits associated with a plurality of past or current users. In certain examples, systems and methods of the present disclosure train a predictive model for generating a metric of expected costs for a prospective user based at least in part upon a plurality of metrics of actual costs associated with a plurality of past or current users. In some examples, the predictive models may include machine learning models, such as neural networks or a combination of machine learning models.

In various embodiments, systems and methods of the present disclosure generate and/or provide one or more marketplace scores and/or trends using one or more marketplace predictive models, such as based on telematics data available on the marketplace. In some examples, the one or more marketplace scores are exclusively available to the marketplace participants via the telematics-data-based-marketplace. For example, the one or more marketplace predictive models are kept confidential to the marketplace and not make available to any marketplace participants such that it is shielded from any marketplace participant-directed changes. In various examples, the systems and methods of the present disclosure may train and modify the one or more marketplace predictive models in view of the interests, goals, and/or requests of the marketplace participants. In some examples, the systems and methods of the present disclosure provide the marketplace scores and/or trends as unique insights to its marketplace participants who would not able to obtain with an alternative method or channel.

In various embodiments, systems and methods of the present disclosure provide an algorithm input interface to its marketplace participants for receiving algorithms provided by each marketplace participant. The algorithms may include one or more use-specific algorithms and/or party-specific algorithms for determining custom scores (e.g., profitability score) associated with one or more vehicle operators of interests. In some examples, systems and methods of the present disclosure may execute the algorithms to determine, based on telematics data and/or marketplace scores available on the marketplace, the custom scores for the associated marketplace participants. In various examples, the custom scores may be determined as composite scores, such as composite scores determined based solely on marketplace scores, such as using party-specified weights and biases. In some examples, the custom scores are indicative of the desirability of the associated vehicle operator to the marketplace participant. In certain examples, algorithms provided by a first marketplace participant may be shared with a selected other marketplace participants or to be shared with no other marketplace participants.

In various embodiments, systems and methods of the present disclosure determine and/or present one or more marketplace scores and, such as upon request, descriptions of the associated marketplace algorithms such that the meaning of the marketplace scores are conveyed to the marketplace participants. For example, the descriptions may generally describe what factors were considered in the determination of the associated marketplace scores. In some examples, such marketplace scores may be referred to as transparent marketplace scores when descriptions of the associated marketplace algorithms are available. In some examples, the provision of algorithm descriptions help aid marketplace participants' determination of which marketplace scores to use or how much each marketplace score should be weighed and/or biased in designing its algorithms for determining use-specific and/or party-specific scores. In other examples, some marketplace scores may be provided to marketplace participants without any algorithm descriptions and may be referred to as opaque marketplace scores. Examples of a transparent score may include an acceleration score, a braking score, a focus score, a steering score, a financial reliability score, and a demographic score. Examples of an opaque score may include an overall desirability score, a predicted profitability score, a predicted retention score, a predicted risk score, and a predicted costs score.

In various embodiments, systems and methods of the present disclosure determine and provide program-evaluation metrics (e.g., predicted probability of acquisition, actual acquisition data, acquisition costs, and/or vehicle operator desirability scores or trends) to a marketplace participant, such as one or more user-acquisition programs the marketplace participant is experimenting (e.g., in an A-B test). For example, systems and methods of the present disclosure determine and provide a first set of program-evaluation metrics associated with a first plurality of vehicle operators subject to a first user-acquisition program, and determine and provide a second set of program-evaluation metrics associated with a second plurality of vehicle operators subject to a second user-acquisition program. Systems and methods of the present disclosure may further compare the first set of program-evaluation metrics against the second set of program-evaluation metrics and generate a comparison report for the marketplace participants to evaluate the effectiveness of its user-acquisition programs. For example, the effectiveness of one or more acquisition incentives, one or more acquisition promotions, one or more acquisition discounts, and/or one or more acquisition services may be extrapolated from the comparison report.

As another example, systems and methods of the present disclosure determine and provide program-evaluation metrics (e.g., predicted probability of acquisition, actual acquisition data, acquisition costs, and/or vehicle operator desirability scores or trends) to a marketplace participant for one or more user-retention programs the marketplace participant is experimenting (e.g., in an A-B test). For example, systems and methods of the present disclosure determine and provide a first set of program-evaluation metrics associated with a first plurality of vehicle operators subject to a first user-retention program, and determine and provide a second set of program-evaluation metrics associated with a second plurality of vehicle operators subject to a second user-retention program. Systems and methods of the present disclosure may further compare the first set of program-evaluation metrics against the second set of program-evaluation metrics and generate a comparison report for the marketplace participants to evaluate the effectiveness of its user-retention programs. For example, the effectiveness of one or more retention incentives, one or more retention promotions, one or more retention discounts, and/or one or more retention services may be extrapolated from the comparison report.

In various embodiments, systems and methods of the present disclosure provide a telematics auction marketplace, provide telematics data, provide telematics-data-based inferences (e.g., marketplace scores, use-specific scores, party-specific scores), and receive a plurality of bids from a plurality of marketplace participants. In some examples, the plurality of bids may be provided by the marketplace participants based on the desirability of an associated vehicle operator. In various examples, the plurality of bids are indicative of the degree of interest the marketplace participants have for an associated vehicle operator. In certain examples, the plurality of bids may be at least for profile information of the associated vehicle operator, advertisement opportunity, advertisement priority, and/or information release priority. As an example, systems and methods of the present disclosure may provide a marketplace participant of a winning bid additional profile information of a vehicle operator associated with the telematics data and/or inferences displayed. Systems and methods of the present disclosure may further provide the marketplace participant of the winning bid with one or more advertisement opportunities via one or more advertisement channels on record showing user activity, such as via an application the user uses, via a webpage visited by the user, via a game played by the user, and/or via a billboard positioned by a route the user travels through.

In various embodiments, systems and methods of the present disclosure provide a telematics auction marketplace configured to select a plurality of winning bids. In some examples, the telematics auction marketplace may auction information related to a vehicle operator to a plurality of marketplace participants, receive a plurality of bids from a plurality of marketplace participants, determine a number of winning bids satisfying a bid threshold (e.g., top percentile among the bids in bid amount and/or in bid time and/or satisfying a predetermined monetary or time threshold), determine different priorities won by the number of winning bids, determine different winning packages associated with the different priorities, and delivering the winning packages to a number of winning bidders associated with the number of winning bids. In various examples, systems and methods of the present disclosure determine a number of winning bids by at least determining a first winning bid and a second winning bid. The first winning bid, when compared to the second winning bid, may be an earlier bid and/or higher bid, or alternatively have the same bid time or at the same bid amount. In some examples, systems and methods of the present disclosure determine the different priorities by at least determining the first winning bid to have won a first winning priority and the second winning bid to have won a second winning priority. The first winning priority may be higher or equal to the second winning priority. In certain examples, systems and methods of the present disclosure determine the winning packages at least determining a first winning package associated with the first winning priority and a second winning package associated with the second winning priority. The first winning package may include a first data package related to a vehicle operator that is more valuable (e.g., more detailed and/or more advanced such as analytical inferences rather than raw data) than a second data package included in the second winning package. The first winning package may alternatively include the same data package as the second winning package but the first winning package is delivered to the associated first winning bidder at an earlier time period than the second winning package to the associated second winning bidder.

In various examples, systems and methods of the present disclosure provide a telematics auction marketplace configured to release several levels of information related to a vehicle operator listed on the auction marketplace. In some examples, systems and methods of the present disclosure generate a plurality of bidding time windows for the marketplace participants to bid. As an example, winning bidder(s) of the winning bid(s) of a first bidding time window may be awarded the highest level of information when compared to winning bidder(s) of the winning bid(s) of all subsequent bidding time window(s) which occur later than the first bidding time window. The highest level of information may include a high level composite score indicative of the desirability of the vehicle operator (e.g., specific to a specific industry, specific market, and/or specific use), whereas a lower level of information, such as those included in winning bids of the subsequent bidding time windows, may include more primitive data and/or primitive scores such as raw telematics data and/or granular scores indicative of granular operator characteristics.

In various embodiments, systems and methods of the present disclosure provide a telematics auction marketplace with conditional bidding, provide telematics data, provide telematics-data-based inferences (e.g., marketplace scores, use-specific scores, party-specific scores), and receive a plurality of conditional bids from a plurality of marketplace participants. In some examples, the plurality of conditional bids may be provided by the marketplace participants based on the desirability of an associated vehicle operator. In various examples, the plurality of conditional bids are indicative of the degree of interest the marketplace participants have for an associated vehicle operator. In certain examples, the plurality of conditional bids may be at least for profile information of the associated vehicle operator, advertisement opportunity, advertisement priority, and/or information release priority. As an example, systems and methods of the present disclosure may provide a marketplace participant of a winning conditional bid additional profile information of a vehicle operator associated with the telematics data and/or inferences displayed. Systems and methods of the present disclosure may further provide the marketplace participant of the winning conditional bid with one or more advertisement opportunities via one or more advertisement channels on record showing user activity, such as via an application the user uses, via a webpage visited by the user, via a game played by the user, and/or via a billboard positioned by a route the user travels through.

In various examples, payment by a winning bidder associated with a conditional bid to the telematics auction marketplace may not be processed or completed (e.g., withheld from completion) until a payment condition is satisfied. This may be in contrast to a non-conditional bid where payment is processed either when the bid was selected as a winner or when the award (e.g., user information) is granted.

In some examples, the payment condition may be a predetermined time of retention, a predetermined profitability, a predetermined profits, a predetermined revenue, a conversion event, an acquisition event. As an example, systems and methods of the present disclosure may deliver an award package (e.g., user information) to a marketplace participant associated with a winning bid without processing the transaction payment. Following the award, systems and methods of the present disclosure may monitor one or more metrics associated with the vehicle operator and the winning marketplace participant. Upon the fulfillment of the payment condition, such as upon the vehicle operator becoming a user of the marketplace participant, the payment may be processed for the transaction.

In various examples, payment by a winning bidder associated with a conditional bid to the telematics auction marketplace may be processed partially (e.g., half) at the time of award and processed partially (e.g., the other half) upon the fulfillment of the payment condition. The payment condition may be a user relationship milestone (e.g., years of being a user exceeding a threshold) or profitability milestone (e.g., accumulative profits exceeding a threshold). In some examples, a plurality of payment conditions may be conditioned into a conditional bid that, if the bid won, would enable a gradual payment structure with one of multiple payments (e.g., installments) processed upon fulfillment of each of the plurality of payment conditions. As an example, systems and methods of the present disclosure may process a first payment at the time of delivering the award package, process a second payment at the time of user acquisition, process a third payment at the time of breakeven (e.g., when user revenue exceeds costs of user acquisition or when the user-resulted revenue exceeds user-resulted costs), process a fourth payment at the time of the minimum profitability (e.g., when the user-resulted revenue exceeds user-resulted costs by a predetermined threshold), and/or process a fifth payment at the time of minimum relationship time (e.g., when the vehicle operator remains a user to the marketplace participant beyond a predetermined threshold). In some examples, a bidding fee related to entering of a marketplace participant's bid may be processed before the bid is considered in the auctioning process. In certain examples, an access fee related to accessing telematics data and/or telematics inferences may be processed. In certain examples, a subscription fee related to allowing usage of the telematics marketplace may be processed.

In various embodiments, systems and methods of the present disclosure provide a telematics auction marketplace configured to receive conditional bids with multiple payment conditions. In some examples, systems and methods of the present disclosure train and/or implement one or more bid profitability predictive models for determining the predicted profit of a conditional bid. In certain examples, systems and methods of the present disclosure determine, using the one or more bid profitability predictive models, a predicted long-term profitability of a conditional bid. In some examples, the predicted long-term profitability of a conditional bid may be a complex profitability metric factoring profitability during a plurality of time periods. For example, the predicted long-term profitability may include a first sub-profitability corresponding to a time period after a first sub-payment is processed after delivering the award package, a second sub-profitability corresponding to a time period after a second sub-payment is processed after user acquisition, a third sub-profitability corresponding to a time period after a third sub-payment is processed at breakeven (e.g., when user revenue exceeds costs of user acquisition or when the user-resulted revenue exceeds user-resulted costs), a fourth sub-profitability corresponding to a time period after a fourth sub-payment is processed at minimum profitability (e.g., when the user-resulted revenue exceeds user-resulted costs by a predetermined threshold), and/or a fifth sub-profitability corresponding to a time period after a fifth sub-payment is processed at the time of minimum relationship time (e.g., when the vehicle operator remains a user to the marketplace participant beyond a predetermined threshold).

In various examples, systems and methods of the present disclosure collect user management data including acquisition data, retention data, costs data, and/or revenue data. In some examples, systems and methods of the present disclosure collect user management data of a plurality of vehicle operators listed on the telematics marketplace, which may be users, customers, and/or clients of one or more marketplace participants. In various examples, systems and methods of the present disclosure train one or more bid profitability predictive models using the collected user management data. In certain examples, systems and methods of the present disclosure determine, using the trained one or more bid profitability predictive models and/or available data of a vehicle operator and/or data of the marketplace participants, how profitable any given marketplace participant would be if matched with the vehicle operator. In some examples, such determination may include determining a predicted period of retention, a predicted costs if become a user of the marketplace participant, and a predicted revenue if becoming a user of the marketplace participant. In certain examples, circumstantial values may be considered to determine whether a user would be a good match with a marketplace participant. Such circumstantial values may include social values (e.g., environmental stance).

In various embodiments, systems and methods of the present disclosure provide an application or web-service to which a user may enroll in or subscribe to. In some examples, the application or web-service may collect user input data (e.g., user preferences), user data (e.g., usage characteristics), and/or telematics data from the user and/or third-party sources. In various examples, the application or web-service may upload the collected data onto the telematics-data-based marketplace such that a plurality of marketplace participants may determine whether to bid on the user. In certain examples, the application or web-service may receive or collect offers from marketplace participants for a plurality of products and automatically select a desired offer. In various examples, the application or web-service may automatically monitor new insurance policy offers extended to the user, such as whenever new telematics data and/or user data are uploaded onto the telematics marketplace. In some examples, application or web-service may automatically switch from existing insurance policy to one of the new insurance policy offers, such as based on user preferences and/or usage characteristics.

Examples of Various Embodiments of the Present Disclosure

According to various embodiments, a computer-implemented method for data management includes: collecting a plurality of personal data sets associated with a plurality of vehicle operators continually; collecting a plurality of sensor data sets associated with the plurality of vehicle operators continually via one or more sensing modules; for each vehicle operator of the plurality of vehicle operators: generating and continually updating an operator profile including the personal data set associated with the vehicle operator; determining and continually updating one or more telematics inferences based at least in part upon the sensor data set associated with the vehicle operator; generating and continually updating a data profile including the one or more telematics inferences associated with the vehicle operator; and listing and continually updating the data profile onto a telematics marketplace to be accessible by a plurality of marketplace participants; receiving, from a plurality of bidders of the plurality of marketplace participants, a plurality of conditional bids for a target operator profile associated with a target data profile selected from the listed data profiles of the plurality of vehicle operators, each conditional bid of the plurality of conditional bids including one or more conditional payments and one or more payment conditions; determining, for each conditional bid of the plurality of conditional bids, a predicted bid-generated profit or a predicted bid-generated revenue; determining, based at least in part upon the predicted profit or predicted bid-generated revenue, a winning bid and an associated winning bidder; and transmitting the target operator profile to the winning bidder. In some examples, the method is implemented according to method 300 of FIG. 3, and/or configured to be implemented by system 100 of FIG. 1, system 200 of FIG. 2, device 5000 of FIG. 4, and/or system 7000 of FIG. 5.

In some embodiments, determining the winning bid includes determining the winning bid as the bid of the plurality of conditional bidders which has the highest predicted bid-generated profit for a marketplace entity.

In some embodiments, determining the predicted bid-generated profit includes determining a predicted bid-generated revenue and a predicted bid-generated costs, and subtracting the predicted bid-generated revenue by the predicted bid-generated costs.

In some embodiments, determining the predicted bid-generated profit includes determining a predicted user retention duration, and determining the winning bid as the bid of the plurality of conditional bids which has the highest predicted long-term bid-generated profit for the full duration of the predicted user pretention duration.

In some embodiments, determining the predicted bid-generated profit includes determining a predicted user retention duration, and determining the winning bid as the bid of the plurality of conditional bids which has the highest predicted period-specific bid-generated profit for a period of interest predetermined by the marketplace entity.

In some embodiments, determining the predicted bid-generated profit includes determining, for each payment condition of the one or more payment conditions, a likelihood of condition fulfillment.

In some embodiments, determining the predicted bid-generated profit includes multiplying, for each payment condition of the one or more payment conditions, the likelihood of condition fulfillment and an associated conditional payment of the one or more conditional payments.

In some embodiments, the one or more conditional payments includes a first conditional payment and a second conditional payment; the one or more conditional payment conditions includes a first payment condition and a second payment condition; the first conditional payment is withheld from completion at least until the first payment condition is satisfied; and the second conditional payment is withheld from completion at least until the first payment condition and the second payment condition are satisfied.

In some embodiments, the one or more sensing modules includes a common module used by a plurality of mobile applications; the common module is a software module or a common hardware module; and each vehicle operator uses at least one mobile application of the plurality of mobile applications.

According to various embodiments, a computing system for one or more processors; and a memory storing instructions that, upon execution by the one or more processors, cause the computing system to perform one or more processes including: collecting a plurality of personal data sets associated with a plurality of vehicle operators continually; collecting a plurality of sensor data sets associated with the plurality of vehicle operators continually via one or more sensing modules; for each vehicle operator of the plurality of vehicle operators: generating and continually updating an operator profile including the personal data set associated with the vehicle operator; determining and continually updating one or more telematics inferences based at least in part upon the sensor data set associated with the vehicle operator; generating and continually updating a data profile including the one or more telematics inferences associated with the vehicle operator; and listing and continually updating the data profile onto a telematics marketplace to be accessible by a plurality of marketplace participants; receiving, from a plurality of bidders of the plurality of marketplace participants, a plurality of conditional bids for a target operator profile associated with a target data profile selected from the listed data profiles of the plurality of vehicle operators, each conditional bid of the plurality of conditional bids including one or more conditional payments and one or more payment conditions; determining, for each conditional bid of the plurality of conditional bids, a predicted bid-generated profit or a predicted bid-generated revenue; determining, based at least in part upon the predicted profit or predicted bid-generated revenue, a winning bid and an associated winning bidder; and transmitting the target operator profile to the winning bidder. In some examples, the system is configured accordingly to system 100 of FIG. 1, system 200 of FIG. 2, device 5000 of FIG. 4, and/or system 7000 of FIG. 5 and/or configured to perform method 300 of FIG. 3.

According to various embodiments, a non-transitory computer-readable medium storing instructions for data management, the instructions upon execution by one or more processors of a computing system, cause the computing system to perform one or more processes including: collecting a plurality of personal data sets associated with a plurality of vehicle operators continually; collecting a plurality of sensor data sets associated with the plurality of vehicle operators continually via one or more sensing modules; for each vehicle operator of the plurality of vehicle operators: generating and continually updating an operator profile including the personal data set associated with the vehicle operator; determining and continually updating one or more telematics inferences based at least in part upon the sensor data set associated with the vehicle operator; generating and continually updating a data profile including the one or more telematics inferences associated with the vehicle operator; and listing and continually updating the data profile onto a telematics marketplace to be accessible by a plurality of marketplace participants; receiving, from a plurality of bidders of the plurality of marketplace participants, a plurality of conditional bids for a target operator profile associated with a target data profile selected from the listed data profiles of the plurality of vehicle operators, each conditional bid of the plurality of conditional bids including one or more conditional payments and one or more payment conditions; determining, for each conditional bid of the plurality of conditional bids, a predicted bid-generated profit or a predicted bid-generated revenue; determining, based at least in part upon the predicted profit or predicted bid-generated revenue, a winning bid and an associated winning bidder; and transmitting the target operator profile to the winning bidder. In some examples, the non-transitory computer-readable medium, upon execution by one or more processors associated with system 100 of FIG. 1, system 200 of FIG. 2, device 5000 of FIG. 4, and/or system 7000 of FIG. 5, causes the corresponding system to perform method 300 of FIG. 3.

Examples of Some Embodiments of the Present Disclosure

In certain embodiments, systems and methods of the present disclosure provide a marketplace where one or more profiles and/or user data of one or more vehicle operators may be shared and/or requested, such as based on telematics data associated with the one or more vehicle operators.

In certain embodiments, systems and methods of the present disclosure provide a marketplace for sharing one or more vehicle operator profiles based at least in part upon telematics data, such as raw sensor data. In various examples, a system (e.g., one including modules to perform a method) and/or a method for sharing operator profiles via a marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating a plurality of data profiles corresponding to the plurality of vehicle operators such that each data profile of the plurality of data profiles includes the sensor data associated with one vehicle operator of the plurality of vehicle operators; listing the plurality of data profiles on a marketplace configured to be accessed by a plurality of parties (e.g., insurance companies, car rental companies, vehicle manufacturing companies, autonomous driving firms, shared ride companies, housing firms, banks, government agencies, etc.); receiving, from a requesting party of the plurality of parties, an information request for a target operator profile associated with a target data profile of the plurality of data profiles; and/or delivering, in response to receiving the information request, the target operator profile to the requesting party.

In certain embodiments, systems and methods of the present disclosure provide a marketplace for sharing one or more vehicle operator profiles based at least in part upon operator score (e.g., determined based on telematics data). In various examples, a system (e.g., one including modules to perform a method) and/or a method for sharing operator profiles via a marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on a marketplace configured to be accessed by a plurality of parties (e.g., insurance companies, car rental companies, vehicle manufacturing companies, autonomous driving firms, shared ride companies, housing firms, banks, government agencies, etc.); receiving, from a requesting party of the plurality of parties, an information request for a target operator profile associated with a target data profile of the plurality of data profiles; and/or delivering, in response to receiving the information request, the target operator profile to the requesting party.

In certain embodiments, systems and methods of the present disclosure provide a marketplace for sharing one or more vehicle operator profiles based at least in part upon universal operator score (e.g., determined based on telematics data). In various examples, a system (e.g., one including modules to perform a method) and/or a method for sharing operator profiles via a marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on a marketplace configured to be accessed by a plurality of parties (e.g., insurance companies, car rental companies, vehicle manufacturing companies, autonomous driving firms, shared ride companies, housing firms, banks, government agencies, etc.); receiving, from a requesting party of the plurality of parties, an information request for a target operator profile associated with a target data profile of the plurality of data profiles; and/or delivering, in response to receiving the information request, the target operator profile to the requesting party. In some examples, generating the one or more operator scores includes generating the one or more operator scores using a universal model configured to generate, such as based at least in part upon sensor data, operator scores informative to a plurality of uses associated with the plurality of third parties.

In certain embodiments, systems and methods of the present disclosure provide a marketplace for sharing one or more vehicle operator profiles based at least in part upon party-specific operator score (e.g., determined based on telematics data) and/or use-specific operator score (e.g., determined based on telematics data). In various examples, a system (e.g., one including modules to perform a method) and/or a method for sharing operator profiles via a marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on a marketplace configured to be accessed by a plurality of parties (e.g., insurance companies, car rental companies, vehicle manufacturing companies, autonomous driving firms, shared ride companies, housing firms, banks, government agencies, etc.); receiving, from a requesting party of the plurality of parties, an information request for a target operator profile associated with a target data profile of the plurality of data profiles; and/or delivering, in response to receiving the information request, the target operator profile to the requesting party. In some examples, generating the one or more operator scores includes: receiving, from the plurality of parties, a plurality of party-provided scoring models, each party-provided scoring model of the plurality of party-provided scoring models being one of a use-specific model and a party-specific model and configured to generate operator scores informative to at least one of a particular use and a particular party; selecting a party-provided scoring model of the plurality of party-provided scoring models based at least in part upon party information; and/or generating the one or more operator scores using the selected party-provided scoring model based at least in part upon the sensor data.

In certain embodiments, systems and methods of the present disclosure provide a marketplace with one or more security measures for sharing one or more vehicle operator profiles based at least in part upon party-specific operator score (e.g., determined based on telematics data) and/or use-specific operator score (e.g., determined based on telematics data). In various examples, a system (e.g., one including modules to perform a method) and/or a method for sharing operator profiles via a marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on a marketplace configured to be accessed by a plurality of parties (e.g., insurance companies, car rental companies, vehicle manufacturing companies, autonomous driving firms, shared ride companies, housing firms, banks, government agencies, etc.); receiving, from a requesting party of the plurality of parties, an information request for a target operator profile associated with a target data profile of the plurality of data profiles; and/or delivering, in response to receiving the information request, the target operator profile to the requesting party. In some examples, generating the one or more operator scores includes: receiving, from the plurality of parties, a plurality of party-provided scoring models, each party-provided scoring model of the plurality of party-provided scoring models being one of a use-specific model and a party-specific model and configured to generate operator scores informative to at least one of a particular use and a particular party; imposing security measures including: limiting the plurality of party-provided scoring models to read-only (or use-only); verifying a party-provided audit key for each party-provided scoring model; and/or generating, for each party-provided scoring model, a log recording each model execution, the log being visible to the party who provided the party-provided scoring model; selecting a party-provided scoring model of the plurality of party-provided scoring models based at least in part upon party information; and/or generating the one or more operator scores using the selected party-provided scoring model based at least in part upon the sensor data.

In certain embodiments, systems and methods of the present disclosure provide a marketplace for sharing one or more vehicle operator profiles based at least in part upon predicted party-specific operator score (e.g., determined based on telematics data) and/or predicted use-specific operator score (e.g., determined based on telematics data), such as using one or more machine learning models. In various examples, a system (e.g., one including modules to perform a method) and/or a method for sharing operator profiles via a marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on a marketplace configured to be accessed by a plurality of parties (e.g., insurance companies, car rental companies, vehicle manufacturing companies, autonomous driving firms, shared ride companies, housing firms, banks, government agencies, etc.); receiving, from a requesting party of the plurality of parties, an information request for a target operator profile associated with a target data profile of the plurality of data profiles; and/or delivering, in response to receiving the information request, the target operator profile to the requesting party. In some examples, generating the one or more operator scores includes: training a plurality of score-predicting models trained to generate, given the same input parameters, operator scores similar to a plurality of party-owned scoring models associated with the plurality of parties; selecting a score-predicting model of the plurality of score-predicting models based at least in part upon party information; and/or generating the one or more operator scores using the selected party-provided scoring model based at least in part upon the sensor data. In some examples, systems and/or methods for training a prediction model (e.g., an artificial intelligence-based model) may be provided, such as for training the prediction model based at least in part upon taking sensor data input and output scores from parties' own models.

In certain embodiments, systems and methods of the present disclosure provide a marketplace for sharing one or more vehicle operator profiles based at least in part upon operator score and/or one or more sub-scores. In various examples, a system (e.g., one including modules to perform a method) and/or a method for sharing operator profiles via a marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, a single operator score based at least in part upon the sensor data; generating a plurality of data profiles corresponding to the plurality of vehicle operators such that each data profile of the plurality of data profiles includes the single operator score associated with one vehicle operator of the plurality of vehicle operators; listing the plurality of data profiles on a marketplace configured to be accessed by a plurality of parties (e.g., insurance companies, car rental companies, vehicle manufacturing companies, autonomous driving firms, shared ride companies, housing firms, banks, government agencies, etc.); receiving, from a requesting party of the plurality of parties, insight request for a target operator profile associated with a target data profile of the plurality of data profiles; generating, in response to receiving the insight request, one or more insight scores (e.g., safety score, reliability score, driving characteristic scores such as acceleration, braking, cornering, raw sensor data, and/or score indicative of behavioral insights of the operator) associated with the target operator profile; receiving, from the requesting party, an information request for a target operator profile associated with a target data profile of the plurality of data profiles; and/or delivering, in response to receiving the information request, the target operator profile to the requesting party.

In certain embodiments, systems and methods of the present disclosure provide a marketplace for sharing one or more vehicle operator profiles based at least in part upon tiers of operator scores (e.g., of the associated vehicle operators). In various examples, a system (e.g., one including modules to perform a method) and/or a method for sharing operator profiles via a marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, a single operator score based at least in part upon the sensor data; generating a plurality of data profiles corresponding to the plurality of vehicle operators such that each data profile of the plurality of data profiles includes the single operator score associated with one vehicle operator of the plurality of vehicle operators; distributing the plurality of data profiles into a plurality of score tiers based on the single operator score associated with each vehicle operator of the plurality of vehicle operators; listing the plurality of data profiles on a marketplace configured to be accessed by a plurality of parties (e.g., insurance companies, car rental companies, vehicle manufacturing companies, autonomous driving firms, shared ride companies, housing firms, banks, government agencies, etc.) according to the plurality of score tiers; receiving, from the requesting party, an information request for one or more target operator profiles of a target score tier of the plurality of score tiers;

and/or delivering, in response to receiving the information request, one or more target operator profiles from the target score tier.

In certain embodiments, systems and methods of the present disclosure provide an auction marketplace for sharing one or more vehicle operator profiles based at least in part upon telematics data, such as raw sensor data. In various examples, a system (e.g., one including modules to perform a method) and/or a method for sharing operator profiles via an auction marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating a plurality of data profiles corresponding to the plurality of vehicle operators such that each data profile of the plurality of data profiles includes the sensor data associated with one vehicle operator of the plurality of vehicle operators; listing the plurality of data profiles on an auction marketplace configured to be accessed by a plurality of parties (e.g., insurance companies, car rental companies, vehicle manufacturing companies, autonomous driving firms, shared ride companies, housing firms, banks, government agencies, etc.); receiving, from a plurality of requesting parties of the plurality of parties, a plurality of information requests for a target operator profile associated with a target data profile of the plurality of data profiles; receiving a plurality of bids associated with the plurality or information requests; determining one or more winning bids from the plurality of bids; and/or delivering the target operator profile to one or more winning parties associated with the one or more winning bids.

In certain embodiments, systems and methods of the present disclosure provide an auction marketplace for sharing one or more vehicle operator profiles based at least in part upon operator score (e.g., determined based on telematic data of the associated vehicle operators). In various examples, a system (e.g., one including modules to perform a method) and/or a method for sharing operator profiles via an auction marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on an auction marketplace configured to be accessed by a plurality of parties (e.g., insurance companies, car rental companies, vehicle manufacturing companies, autonomous driving firms, shared ride companies, housing firms, banks, government agencies, etc.); receiving, from a plurality of requesting parties of the plurality of parties, a plurality of information requests for a target operator profile associated with a target data profile of the plurality of data profiles; receiving a plurality of bids associated with the plurality or information requests; determining one or more winning bids from the plurality of bids; and/or delivering the target operator profile to one or more winning parties associated with the one or more winning bids.

In certain embodiments, systems and methods of the present disclosure provide an auction marketplace for sharing one or more vehicle operator profiles based at least in part upon universal operator score (e.g., determined based on telematic data of the associated vehicle operators). In various examples, a system (e.g., one including modules to perform a method) and/or a method for sharing operator profiles via an auction marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on an auction marketplace configured to be accessed by a plurality of parties (e.g., insurance companies, car rental companies, vehicle manufacturing companies, autonomous driving firms, shared ride companies, housing firms, banks, government agencies, etc.); receiving, from a plurality of requesting parties of the plurality of parties, a plurality of information requests for a target operator profile associated with a target data profile of the plurality of data profiles; receiving a plurality of bids associated with the plurality or information requests; determining one or more winning bids from the plurality of bids; and/or delivering the target operator profile to one or more winning parties associated with the one or more winning bids. In some examples, generating the one or more operator scores includes generating the one or more operator scores using a universal model configured to generate, based at least in part upon sensor data, operator scores informative to a plurality of uses associated with the plurality of third parties.

In certain embodiments, systems and methods of the present disclosure provide an auction marketplace for sharing one or more vehicle operator profiles based at least in part upon party-specific operator score (e.g., determined based on telematic data) and/or use-specific operator score (e.g., determined based on telematic data). In various examples, a system (e.g., one including modules to perform a method) and/or a method for sharing operator profiles via an auction marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on an auction marketplace configured to be accessed by a plurality of parties (e.g., insurance companies, car rental companies, vehicle manufacturing companies, autonomous driving firms, shared ride companies, housing firms, banks, government agencies, etc.); receiving, from a plurality of requesting parties of the plurality of parties, a plurality of information requests for a target operator profile associated with a target data profile of the plurality of data profiles; receiving a plurality of bids associated with the plurality or information requests; determining one or more winning bids from the plurality of bids; and/or delivering the target operator profile to one or more winning parties associated with the one or more winning bids. In some examples, generating the one or more operator scores includes: receiving, from the plurality of parties, a plurality of party-provided scoring models, each party-provided scoring model of the plurality of party-provided scoring models being one of a use-specific model and a party-specific model and configured to generate operator scores informative to at least one of a particular use and a particular party; selecting a party-provided scoring model of the plurality of party-provided scoring models based at least in part upon party information; and/or generating the one or more operator scores using the selected party-provided scoring model based at least in part upon the sensor data.

In certain embodiments, systems and methods of the present disclosure provide an auction marketplace with one or more security measures for sharing one or more vehicle operator profiles based at least in part upon party-specific operator score (e.g., determined based on telematic data) and/or use-specific operator score (e.g., determined based on telematic data). In various examples, a system (e.g., one including modules to perform a method) and/or a method for sharing operator profiles via an auction marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on an auction marketplace configured to be accessed by a plurality of parties (e.g., insurance companies, car rental companies, vehicle manufacturing companies, autonomous driving firms, shared ride companies, housing firms, banks, government agencies, etc.); receiving, from a plurality of requesting parties of the plurality of parties, a plurality of information requests for a target operator profile associated with a target data profile of the plurality of data profiles; receiving a plurality of bids associated with the plurality or information requests; determining one or more winning bids from the plurality of bids; and delivering the target operator profile to one or more winning parties associated with the one or more winning bids. In some examples, generating the one or more operator scores includes: receiving, from the plurality of parties, a plurality of party-provided scoring models, each party-provided scoring model of the plurality of party-provided scoring models being one of a use-specific model and a party-specific model and configured to generate operator scores informative to a particular use and a particular party; imposing security measures including one of: limiting the plurality of party-provided scoring models to read-only (or use-only); verifying a party-provided audit key for each party-provided scoring model; and/or generating, for each party-provided scoring model, a log recording each model execution, the log being visible to the party who provided the party-provided scoring model; selecting a party-provided scoring model of the plurality of party-provided scoring models based at least in part upon party information; and/or generating the one or more operator scores using the selected party-provided scoring model based at least in part upon the sensor data.

In certain embodiments, systems and methods of the present disclosure provide an auction marketplace for sharing one or more vehicle operator profiles based at least in part upon party-specific operator score (e.g., determined based on telematic data) and/or use-specific operator score (e.g., determined based on telematic data) via one or more machine learning algorithms. In various examples, a system (e.g., one including modules to perform a method) and/or a method for sharing operator profiles via an auction marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on an auction marketplace configured to be accessed by a plurality of parties (e.g., insurance companies, car rental companies, vehicle manufacturing companies, autonomous driving firms, shared ride companies, housing firms, banks, government agencies, etc.); receiving, from a plurality of requesting parties of the plurality of parties, a plurality of information requests for a target operator profile associated with a target data profile of the plurality of data profiles; receiving a plurality of bids associated with the plurality or information requests; determining one or more winning bids from the plurality of bids; and/or delivering the target operator profile to one or more winning parties associated with the one or more winning bids. In some examples, generating the one or more operator scores includes: training a plurality of score-predicting models trained to generate, given the same input parameters, operator scores similar to a plurality of party-owned scoring models associated with the plurality of parties; selecting a score-predicting model of the plurality of score-predicting models based at least in part upon party information; and/or generating the one or more operator scores using the selected party-provided scoring model based at least in part upon the sensor data. In some examples, systems and/or methods for training a prediction model (e.g., an artificial intelligence-based model) may be provided, such as for training the prediction model based at least in part upon taking sensor data input and output scores from parties' own models.

In certain embodiments, systems and methods of the present disclosure provide an auction marketplace for sharing one or more vehicle operator profiles based at least in part upon operator score and/or one or more sub-scores (e.g., determined based on telematic data). In various examples, a system (e.g., one including modules to perform a method) and/or a method for sharing operator profiles via an auction marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, a single operator score based at least in part upon the sensor data; generating a plurality of data profiles corresponding to the plurality of vehicle operators such that each data profile of the plurality of data profiles includes the single operator score associated with one vehicle operator of the plurality of vehicle operators; listing the plurality of data profiles on an auction marketplace configured to be accessed by a plurality of parties (e.g., insurance companies, car rental companies, vehicle manufacturing companies, autonomous driving firms, shared ride companies, housing firms, banks, government agencies, etc.); receiving, from a requesting party of the plurality of parties, insight request for a target operator profile associated with a target data profile of the plurality of data profiles; generating, in response to receiving the insight request, one or more insight scores (e.g., safety score, reliability score, driving characteristic scores such as acceleration, braking, cornering, raw sensor data, and/or score indicative of behavioral insights of the operator) associated with the target operator profile; receiving, from a plurality of requesting parties of the plurality of parties, a plurality of information requests for a target operator profile associated with a target data profile of the plurality of data profiles; receiving a plurality of bids associated with the plurality or information requests; determining one or more winning bids from the plurality of bids; and/or delivering the target operator profile to one or more winning parties associated with the one or more winning bids.

In certain embodiments, systems and methods of the present disclosure provide an auction marketplace for sharing one or more vehicle operator profiles based at least in part upon tiers of operator score (e.g., determined based on telematic data). In various examples, a system (e.g., one including modules to perform a method) and/or a method for sharing operator profiles via an auction marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, a single operator score based at least in part upon the sensor data; generating a plurality of data profiles corresponding to the plurality of vehicle operators such that each data profile of the plurality of data profiles includes the single operator score associated with one vehicle operator of the plurality of vehicle operators; distributing the plurality of data profiles into a plurality of score tiers based on the single operator score associated with each vehicle operator of the plurality of vehicle operators; listing the plurality of data profiles on an auction marketplace configured to be accessed by a plurality of parties (e.g., insurance companies, car rental companies, vehicle manufacturing companies, autonomous driving firms, shared ride companies, housing firms, banks, government agencies, etc.) according to the plurality of score tiers; receiving, from a plurality of requesting parties of the plurality of parties, a plurality of information requests for a target operator profile associated with a target data profile of the plurality of data profiles; receiving a plurality of bids associated with the plurality or information requests; determining one or more winning bids from the plurality of bids; and/or delivering the target operator profile to one or more winning parties associated with the one or more winning bids.

In certain embodiments, systems and methods of the present disclosure provide an auction marketplace for sharing one or more vehicle operator profiles based at least in part upon operator score (e.g., determined based on telematic data) using time-division auctioning. In various examples, a system (e.g., one including modules to perform a method) and/or a method for sharing operator profiles via an auction marketplace includes: receiving sensor data associated with a plurality of vehicle operators, the sensor data collected via one or more sensors associated with each vehicle operator of the plurality of vehicle operators; generating, for each vehicle operator of the plurality of vehicle operators, an operator profile including personal information associated with each vehicle operator; generating, for each vehicle operator of the plurality of vehicle operators, one or more operator scores (e.g., safety score, reliability score, driving characteristic scores such as acceleration, braking, cornering, and/or score indicative of behavioral insights of the operator) based at least in part upon the sensor data; generating a plurality of data profiles corresponding to the plurality of vehicle operators such that each data profile of the plurality of data profiles includes the one or more operator scores associated with one vehicle operator of the plurality of vehicle operators; listing the plurality of data profiles on an auction marketplace configured to be accessed by a plurality of parties (e.g., insurance companies, car rental companies, vehicle manufacturing companies, autonomous driving firms, shared ride companies, housing firms, banks, government agencies, etc.); receiving, from a plurality of requesting parties of the plurality of parties, a plurality of information requests for a target operator profile associated with a target data profile of the plurality of data profiles; receiving a plurality of bids associated with the plurality or information requests; determining a highest winning bid from the plurality of bids; determining a second-highest winning bid from the plurality of bids; delivering the target operator profile to a first winning party associated with the highest winning bid during a first time period; and/or delivering the target operator profile to a second winning party associated with the second-highest winning bid during a second time period following the first time period.

In certain embodiments, systems and methods of the present disclosure monitors one or more changes of one or more driving behaviors of one or more vehicle operators as a function of business models. In various examples, a system (e.g., one including modules to perform a method) and/or a method for monitoring operator scores includes: receiving first sensor data associated with a vehicle operator, the first sensor data collected via one or more sensors associated with the vehicle operator during a first period corresponding to when the vehicle operator is subject to a first insurance model; generating one or more first operator scores (e.g., safety score, reliability score, driving characteristic scores such as acceleration, braking, cornering, and/or score indicative of behavioral insights of the operator) associated with the vehicle operator based at least in part upon the first sensor data; receiving second sensor data associated with a vehicle operator, the second sensor data collected via the one or more sensors associated with the vehicle operator during a second period corresponding to when the vehicle operator is subject to a second insurance model; generating one or more second operator scores (e.g., safety score, reliability score, driving characteristic scores such as acceleration, braking, cornering, and/or score indicative of behavioral insights of the operator) associated with the vehicle operator based at least in part upon the second sensor data; and/or determining a score trend based at least in part upon the one or more first operator scores and the one or more second operator scores, the score trend indicative of the effectiveness of an insurance model in encouraging safe driving behaviors.

In certain embodiments, systems and methods of the present disclosure shares one or more user profiles containing universal telematics data collected via a shared module (e.g., a common software development kit). In various examples, a system (e.g., one including modules to perform a method) and/or a method for sharing user profiles includes: establishing a marketplace accessible to a plurality of parties (e.g., insurance companies, car rental companies, vehicle manufacturing companies, autonomous driving firms, shared ride companies, housing firms, banks, government agencies, etc.); receiving telematics data from a plurality of contributing parties of the plurality of parties, telematics data being collected, by each contributing party of the plurality of contributing parties, via a shared module installed in at least one of a party-associated hardware collector and a party-associated processor-executable program (e.g., a gaming app, vehicle condition tracking app, carbon emission monitoring app, on-board vehicle computer OS); generating a plurality of data profiles based at least in part upon the telematics data received from the plurality of contributing parties such that telematics data associated with one user are included in one data profile of the plurality of data profiles; generating a plurality of user profiles such that each user profile of the plurality of user profiles includes user information of the user to which a data profile of the plurality of data profiles corresponds; listing the plurality of data profiles on the marketplace; receiving, from a requesting party (e.g., may be a contributing or a non-contributing party) of the plurality of parties, an information request for a target user profile associated with a target data profile of the plurality of data profiles; and/or delivering, in response to receiving the information request, the target user profile to the requesting party.

In certain embodiments, systems and methods of the present disclosure shares one or more user profiles via a subscription-based universal telematics marketplace with multiple levels of subscriptions of different levels of data access. In various examples, a system (e.g., one including modules to perform a method) and/or a method for sharing user profiles includes: establishing a marketplace accessible to a plurality of subscribed parties (e.g., insurance companies, car rental companies, vehicle manufacturing companies, autonomous driving firms, shared ride companies, housing firms, banks, government agencies, etc.), each subscribed party having one of a first level subscription, a second level subscription, and a third level subscription; receiving sensor data corresponding to a plurality of vehicle operators from a plurality of contributing parties; generating, for each vehicle operator of the plurality of vehicle operators, an overall score and one or more sub-scores (e.g., safety score, reliability score, driving characteristic scores such as acceleration, braking, cornering, and/or score indicative of behavioral insights of the operator) based at least in part upon the sensor data; generating a plurality of data profiles based at least in part upon the sensor data received from the plurality of contributing parties such that sensor data, overall score, and one or more sub-scores associated with one user are included in one data profile of the plurality of data profiles; generating a plurality of user profiles such that each user profile of the plurality of user profiles includes user information of the user to which a data profile of the plurality of data profiles corresponds; listing the plurality of data profiles on the marketplace such that: the sensor data of the plurality of data profiles are accessible by one or more first level subscribers of the plurality of subscribers having the first level subscription; the overall scores of the plurality of data profiles are accessible by one or more second level subscribers of the plurality of subscribers having the second level subscription; and/or the one or more sub-scores of the plurality of data profiles are accessible by one or more third level subscribers of the plurality of subscribers having the third level subscription; receiving, from a requesting party (e.g., may be a contributing or a non-contributing party) of the plurality of parties, an information request for a target user profile associated with a target data profile of the plurality of data profiles; and/or delivering the target user profile to the requesting party.

In certain embodiments, systems and methods of the present disclosure shares one or more user profiles via an universal telematics marketplace with multiple levels of subscriptions of different levels access policies. In various examples, a system (e.g., one including modules to perform a method) and/or a method for sharing user profiles includes: establishing a marketplace accessible to a plurality of accessing parties (e.g., insurance companies, car rental companies, vehicle manufacturing companies, autonomous driving firms, shared ride companies, housing firms, banks, government agencies, etc.), each accessing party having one of an open access license and an closed access license; receiving telematics data from a plurality of contributing parties of the plurality of parties, telematics data being collected, by each contributing party of the plurality of contributing parties, via a shared module installed in at least one of a party-associated hardware collector and a party-associated processor-executable program (e.g., a gaming app, vehicle condition tracking app, carbon emission monitoring app, on-board vehicle computer OS); generating a plurality of data profiles based at least in part upon the telematics data received from the plurality of contributing parties such that telematics data associated with one user are included in one data profile of the plurality of data profiles; generating a plurality of user profiles such that each user profile of the plurality of user profiles includes user information of the user to which a data profile of the plurality of data profiles corresponds; listing the plurality of data profiles on the marketplace; receiving, from a requesting party (e.g., may be a contributing or a non-contributing party) of the plurality of parties, an information request for a target user profile associated with a target data profile of the plurality of data profiles; determining whether a license type of a contributing party corresponding to the target data profile is a closed access license or an open access license; and/or delivering, in response to determining the license type of the contributing party is the open access license, the target user profile to the requesting party.

In certain embodiments, systems and methods of the present disclosure shares one or more user profiles via an universal telematics marketplace with multiple levels of access policies based at least in part upon level-specific license keys. In various examples, a system (e.g., one including modules to perform a method) and/or a method for sharing user profiles includes: establishing a marketplace accessible to a plurality of accessing parties (e.g., insurance companies, car rental companies, vehicle manufacturing companies, autonomous driving firms, shared ride companies, housing firms, banks, government agencies, etc.), each accessing party having one of an open access license and an closed access license; receiving telematics data from a plurality of contributing parties of the plurality of parties, telematics data being collected, by each contributing party of the plurality of contributing parties, via a shared module installed in at least one of a party-associated hardware collector and a party-associated processor-executable program (e.g., a gaming app, vehicle condition tracking app, carbon emission monitoring app, on-board vehicle computer OS); generating a plurality of data profiles based at least in part upon the telematics data received from the plurality of contributing parties such that telematics data associated with one user are included in one data profile of the plurality of data profiles; generating a plurality of user profiles such that each user profile of the plurality of user profiles includes user information of the user to which a data profile of the plurality of data profiles corresponds; listing the plurality of data profiles on the marketplace; receiving, from a requesting party (e.g., may be a contributing or a non-contributing party) of the plurality of parties, an information request for a target user profile associated with a target data profile of the plurality of data profiles, the target data profile including sensor data collected by a contributing party having a closed access license; verifying a license key of the requesting party against a license key of the contributing party; and/or delivering, in response to successfully verifying the license key between the requesting party and the contributing party, the target user profile to the requesting party.

In various embodiments, systems and methods for sharing user profiles containing universal telematics data collected using a shared module (e.g., same SDK), systems and methods for sharing user profiles via a subscription-based universal telematics marketplace with different levels of subscriptions for different levels of data, systems and methods for sharing user profiles via a universal telematics marketplace with different levels of access policies, and/or systems and methods for sharing user profiles via a universal telematics marketplace with different levels of access policies based on license key are modified and/or combined with systems and methods for sharing vehicle operator profiles based on raw telematics data via a marketplace; systems and methods for sharing vehicle operator profiles based on operator score via a marketplace; systems and methods for sharing vehicle operator profiles based on universal operator score via a marketplace; systems and methods for sharing vehicle operator profiles based on party-specific or use-specific operator score via a marketplace; systems and methods for securely sharing vehicle operator profiles based on party-specific or use-specific operator score via a marketplace with one or more security measures; systems and methods for sharing vehicle operator profiles based on predicted party-specific or use-specific operator score via a marketplace; systems and methods for sharing vehicle operator profiles based on vehicle operator score and one or more sub-scores via a marketplace; and/or systems and methods for sharing vehicle operator profiles based on tiers of operator scores via a marketplace.

In various embodiments, third parties such as insurance companies no longer need to provide a party-specific software application and/or hardware-based telematics data collecting device to their customers and/or candidates to collect telematics data, which may be used for determining discounts, rewards, pricing, and/or recommendations. In some examples, provided to users is a universal collector (e.g., a software application and/or hardware-based device) configured to collect telematics data shareable to a plurality of parties, such as parties of different industries. In certain examples, the universal collector is configured to utilize, or provide the telematics data to another device that is configured to utilize, the telematics data for one or more uses in addition to providing the telematics data to the plurality of parties, such as upon request. For example, a universal collector is configured to utilize the telematics data for monitoring carbon emission and/or enhancing user interaction and user experience with a software application, such as a game, such as a game with a virtual driver.

In various embodiments, systems and methods of the present disclosure for generating leads for a plurality of parties includes receiving universal telematics data, such as one collected using a universal collector, as input, generating one or more scores, metrics, characteristics, and/or pricing associated with a vehicle operator to which the telematics data are in association. In some examples, systems and methods of the present disclosure generate a single score for each vehicle operator to represent an overall safe driving score and/or reliability score for the vehicle operator. In certain examples, parties may select and purchase leads for one or more vehicle operators based at least in part upon the single score, such that more information, such as more detailed scores and/or raw telematics data, are provided to the parties who purchased the leads. In various examples, parties may select vehicle operators blindly based solely on their scores, such as via a selection of a score tier, from which telematics data and/or operator scores associated with one vehicle operator categorized to that score tier are shared with the purchasing party. In some examples, score thresholds may be placed by the requesting parties to limit candidate vehicle operators to only ones having operator scores greater than or equal to the score thresholds.

In various embodiments, systems and methods of the present disclosure generate party-specific and/or use-specific scores associated with vehicle operators using party-provided models for generating scores for a particular use associated with the party. In certain examples, the party-provided models may be a full version or a stripped-down version for generating preliminary scores.

In various examples, systems and methods of the present disclosure, by providing operator scores instead of raw telematics data, help reduce network load and cost, processing load and cost, and/or storage size and cost, for requesting parties. In some examples, security measures may be implemented to help ensure party-provided models are used securely. For example, via the use of read-only (or use-only) access, audit key, and usage log visible to the model-providing parties.

In some embodiments, systems and methods of the present disclosure generate party-specific and/or use-specific scores associated with vehicle operators using predictive models trained using artificial intelligence, such as by taking the input (e.g., sensor data) and output (e.g., score, price) from parties, for generating scores for a particular use and/or a party.

In some embodiments, systems and methods of the present disclosure directly provide collected telematics data to requesters or purchasers such that the requesters or purchasers may take telematics data as input for their own score-generating models.

In various embodiments, systems and methods of the present disclosure provide telematics data collected, such as after labeling, such as in the form of operator scores, on a marketplace configured to be accessed by a plurality of parties, such as including parties from different industries. In certain examples, the marketplace is an auction marketplace configured to take bids for leads and share telematics data to the winning bids. In some examples, the auction marketplace is configured to provide the winning bid a time slot (e.g., minutes, hours, or days) to select vehicle operators to obtain telematics data associated with the selected vehicle operators. In certain examples, multiple winning bids are selected, and each requesting party associated with each winning bid can select one or more vehicle operators to obtain telematics data associated with the selected one or more vehicle operators. In some examples, the highest winning bid receives information associated with a vehicle operator in a first time slot, then the second-highest winning bid receives the same information in a second time slot following the first time slot. This may be referred to as time-division bidding.

In certain examples, systems and methods of the present disclosure provide, upon request of a party as part of the auction, additional information such as personal history, preliminary scores, score ranges, prior to the bidding stage of the auctioning, such as in exchange for a disclosure fee.

In various examples, when the winning requesting party associated with the winning bid obtains a list of vehicle operators satisfying one or more criteria.

In various examples, systems and methods of the present disclosure generate and provide scores specific to a user and/or a party such that the scores are informative to the party specifically for a particular use. For example, systems and methods generate and provide a safety score associated with a vehicle operator for insurance companies, car rental companies, and/or (highway) safety agencies. In another example, systems and methods generate and provide a payment reliability score associated with a vehicle operator for parties considering the vehicle operator as a customer. In another example, systems and methods generate and provide behavioral scores associated with the vehicle operator for companies considering the vehicle operator as a customer. For example, in addition to credit check and background check, landlords, real estate agents and property managers can request a behavioral score generated based on telematics data to help with decision whether the prospective renter or buyer would be a good selection. In various examples, systems and methods generate and provide vehicle type-specific scores for automobile manufacturers for improving safety of future products.

In some examples, systems and methods of the present disclosure monitor driving behaviors of vehicle operators, such as including tracking behavioral changes as a function of which party the vehicle operator is in association with. In some examples, systems and methods evaluate multiple business models, such as ones adopted by multiple organizations for generating premiums, discounts, and/or rewards for its customers, based on driving behavior indicated by the telematics data.

In various embodiments, systems and methods of the present disclosure provide a software development kit (SDK) for collecting telematics data to multiple parties to be shared across platforms of various uses (e.g., gaming, vehicle condition tracking, carbon emission monitoring). For example, multiple software application developed using the shared SDK, when in association (e.g., installed onto a mobile device) with a vehicle operator, only one copy of the telematics data collection program may be run with others suspended to save processing power and reduce redundancy. Data collected are shared across the different uses, such as to enhance user interaction and user experience with the particular use (e.g., app, game). In some examples, a shared SDK can help produce uniformed output of a shared format across multiple parties collecting telematics data via their corresponding data collector (e.g., software and/or hardware).

In various embodiments, systems and methods of the present disclosure collects telematics data from any device installed with the SDK, such as from mobile devices installed with software applications including the SDK and/or from automobiles installed with the SDK on their on-board computers.

In certain embodiments, systems and methods of the present disclosure provide a telematics database configured to be subscribed by a plurality of parties (e.g., companies, organizations, agencies, individuals), such as in a limited license (or limited subscription) or in an exclusive license (or full subscription).

In some examples, parties with limited licenses to the database may collect telematics data from its customers using a universal collector (e.g., end-users of data collecting software applications and/or hardware) for the party's own use, and the data collected by parties with limited licenses are available to the plurality of parties subscribed (or has license) to the database, regardless of whether the license was limited or exclusive.

In some examples, parties with exclusive licenses to the database may collect telematics data from its customers using a universal collector (e.g., end-users of data collecting software applications and/or hardware) for the party's own use, and exclude all other parties subscribed (or has license) to the database from accessing its data. The universal collector may be installed with the shared SDK.

In some examples, subscribers of the database can request telematics data of one or more vehicle operators from one or more other parties subscribed to the database directly, and the parties receiving the requests may choose to reject or authorize the data share.

In some examples, the database is configured to allow subscribers who do not contribute telematics data to the database, but instead only consume by requesting telematics data, such as via a consumption-only license or subscription.

In certain examples, a subscriber in an industry, such as banking, that does not collect telematics data of its customers (e.g., who are on the database because telematics data were collected from them via other one or more software applications and/or hardware associated with other subscribers to the database), can request customer information (e.g., behavioral scores) associated with its customers from the database, the customer information being generated based at least in part upon telematics data.

In various embodiments, systems and methods of the present disclosure provide a driving telematics platform configured to be accessed by multiple parties, such as insurance companies, and configured to collect telematics data from a plurality of users, such as via software applications and/or collection hardware, such as in a uniform data format, such as via a shared SDK.

One or More Examples of Machine Learning According to Various Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

One or More Examples of Modules According to Various Embodiments

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computing systems (e.g., a standalone, client or server computing system) or one or more hardware modules of a computing system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Additional Considerations According to Various Embodiments

In some examples, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computing systems (e.g., a standalone, client or server computing system) or one or more hardware modules of a computing system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for data management, the computer-implemented method comprising:

collecting a plurality of telematics data sets for a plurality of users associated with a plurality of marketplace participants via a software development kit (SDK) configured to be able to be installed on: (1) one or more mobile devices of the plurality of users, (2) one or more third-party applications on the one or more mobile devices of the plurality of users, and (3) one or more on-board computers of one or more automobiles of the plurality of users, wherein the plurality of users include a plurality of vehicle operators, wherein, when the SDK is installed on multiple third-party applications on a same mobile device, a single copy of a telematics data collection program is run while any other telematics collection programs are suspended to save processing power and reduce redundancy, and wherein the collecting of the plurality of telematics data sets for the plurality of users associated with the plurality of marketplace participants via the SDK comprises:

collecting continually a plurality of sensor data sets associated with the plurality of vehicle operators via one or more sensors when each of the one or more sensors has collected a predetermined threshold amount of respective sensor measurements, wherein the one or more sensors include at least one of a Global Positioning Systems (GPS) sensor, an accelerometer, or a gyroscope, the one or more sensors are configured to collect at least one of location sensor data, orientation sensor data, acceleration sensor data, or velocity sensor data;

for each respective vehicle operator of the plurality of vehicle operators:

producing, by the SDK, a uniformed output of a telematics data set of the plurality of telematics data sets in a standardized format, wherein the telematics data set in the standardized format includes a sensor data set of the plurality of sensor data sets in the standardized format;

determining and continually updating one or more telematics inferences based at least in part upon the sensor data set of the plurality of sensor data sets associated with a respective vehicle operator using one or more predictive models each having a respective first plurality of weights provided by a marketplace participant of the plurality of marketplace participants;

generating and continually updating a data profile including the one or more telematics inferences associated with the respective vehicle operator, wherein the data profile includes a universal operator score configured to be utilized for a plurality of uses by the plurality of marketplace participants, wherein a machine learning model generates the universal operator score by utilizing the sensor data set of the plurality of sensor data sets, wherein the machine learning model has a second plurality of weights that are configured to be trained by utilizing the plurality of sensor data sets associated with the vehicle operator obtained from the GPS sensor, the accelerometer, or the gyroscope, wherein the second plurality of weights include one or more weights that correspond to each of the one or more sensors, and wherein the machine learning model comprises a convolutional neural network;

receiving, from a plurality of bidders of the plurality of marketplace participants, a plurality of conditional bids for a target data profile selected from the data profiles of the plurality of vehicle operators, each conditional bid of the plurality of conditional bids including one or more conditional payments and one or more payment conditions;

determining, for each conditional bid of the plurality of conditional bids and based upon at least the one or more conditional payments and the one or more payment conditions, a predicted winning bid; and transmitting an operator profile associated with a winning bid to an associated winning bidder based at least in part upon the predicted winning bid.

2. The computer-implemented method of claim 1, wherein the determining, for each conditional bid of the plurality of conditional bids and based upon at least the one or more conditional payments and the one or more payment conditions, the predicted winning bid further comprises:

assigning a weight modifier to each of the one or more payment conditions, determining a likelihood of success of each of the one or more payment conditions, identifying a respective one of the one or more conditional payments associated with each of the one or more payment conditions, and multiplying the weight modifier, the likelihood of success, and the respective one of the one or more conditional payments associated with each of the one or more payment conditions;

wherein the computer-implemented method further comprises determining, based at least in part upon the predicted winning bid, the winning bid and the associated winning bidder; and wherein the determining the predicted winning bid includes:

determining the winning bid as a bid of the plurality of conditional bids in which a predicted bid-generated profit for a marketplace entity is highest.

3. The computer-implemented method of claim 1, wherein the determining the predicted winning bid includes:

determining a predicted bid-generated revenue and a predicted bid-generated costs; and subtracting the predicted bid-generated revenue by the predicted bid-generated costs.

4. The computer-implemented method of claim 1, wherein the determining the predicted winning bid includes:

determining a predicted user retention duration; and determining the winning bid as a bid of the plurality of conditional bids in which a predicted long-term bid-generated profit for a full duration of the predicted user retention duration is highest.

5. The computer-implemented method of claim 1, wherein the determining the predicted winning bid includes:

determining a predicted user retention duration; and determining the winning bid as a bid of the plurality of conditional bids in which a predicted period-specific bid-generated profit for a period of interest predetermined by a marketplace entity is highest.

6. The computer-implemented method of claim 1, wherein the determining the predicted winning bid includes:

determining, for each payment condition of the one or more payment conditions, a likelihood of condition fulfillment.

7. The computer-implemented method of claim 6, wherein the determining the predicted winning bid includes:

multiplying, for each payment condition of the one or more payment conditions, the likelihood of condition fulfillment and an associated conditional payment of the one or more conditional payments.

8. The computer-implemented method of claim 1, wherein:

the one or more conditional payments includes a first conditional payment and a second conditional payment;

the one or more payment conditions includes a first payment condition and a second payment condition;

the first conditional payment is withheld from completion at least until the first payment condition is satisfied; and the second conditional payment is withheld from completion at least until the first payment condition and the second payment condition are satisfied.

9. The computer-implemented method of claim 1, wherein:

the one or more sensors are used by a plurality of mobile applications; and each of the plurality of vehicle operators uses at least one mobile application of the plurality of mobile applications.

10. A computing system, the computing system comprising:

one or more processors; and a memory storing instructions that, upon execution by the one or more processors, cause the computing system to perform one or more processes including:

collecting a plurality of telematics data sets for a plurality of users associated with a plurality of marketplace participants via a software development kit (SDK) configured to be able to be installed on: (1) one or more mobile devices of the plurality of users, (2) one or more third-party applications on the one or more mobile devices of the plurality of users, and (3) one or more on-board computers of one or more automobiles of the plurality of users, wherein the plurality of users include a plurality of vehicle operators, wherein, when the SDK is installed on multiple third-party applications on a same mobile device, a single copy of a telematics data collection program is run while any other telematics collection programs are suspended to save processing power and reduce redundancy, and wherein the collecting of the plurality of telematics data sets for the plurality of users associated with the plurality of marketplace participants via the SDK comprises:
  collecting continually a plurality of sensor data sets associated with the plurality of vehicle operators via one or more sensors when each of the one or more sensors has collected a predetermined threshold amount of respective sensor measurements, wherein the one or more sensors include at least one of a Global Positioning Systems (GPS) sensor, an accelerometer, or a gyroscope, the one or more sensors are configured to collect at least one of location sensor data, orientation sensor data, acceleration sensor data, or velocity sensor data;
for each respective vehicle operator of the plurality of vehicle operators:
producing, by the SDK, a uniformed output of a telematics data set of the plurality of telematics data sets in a standardized format, wherein the telematics data set in the standardized format includes a sensor data set of the plurality of sensor data sets in the standardized format;
  determining and continually updating one or more telematics inferences based at least in part upon the sensor data set of the plurality of sensor data sets associated with a respective vehicle operator using one or more predictive models each having a respective first plurality of weights provided by a marketplace participant of the plurality of marketplace participants;
  generating and continually updating a data profile including the one or more telematics inferences associated with the respective vehicle operator, wherein the data profile includes a universal operator score configured to be utilized for a plurality of uses by the plurality of marketplace participants, wherein a machine learning model generates the universal operator score by utilizing the sensor data set of the plurality of sensor data sets, wherein the machine learning model has a second plurality of weights that are configured to be trained by utilizing the plurality of sensor data sets associated with the vehicle operator obtained from the GPS sensor, the accelerometer, or the gyroscope, wherein the second plurality of weights include one or more weights that correspond to each of the one or more sensors, and wherein the machine learning model comprises a convolutional neural network;
receiving, from a plurality of bidders of the plurality of marketplace participants, a plurality of conditional bids for a target data profile selected from the data profiles of the plurality of vehicle operators, each conditional bid of the plurality of conditional bids including one or more conditional payments and one or more payment conditions;
determining, for each conditional bid of the plurality of conditional bids and based upon at least the one or more conditional payments and the one or more payment conditions, a predicted winning bid; and transmitting an operator profile, associated with a winning bid to an associated winning bidder based at least in part upon the predicted winning bid.

11. The computer system of claim 10,
wherein the determining, for each conditional bid of the plurality of conditional bids and based upon at least the one or more conditional payments and the one or more payment conditions, the predicted winning bid further comprises:
  assigning a weight modifier to each of the one or more payment conditions,
  determining a likelihood of success of each of the one or more payment conditions,
  identifying a respective one of the one or more conditional payments associated with each of the one or more payment conditions, and
  multiplying the weight modifier, the likelihood of success, and the respective one of the one or more conditional payments associated with each of the one or more payment conditions;
wherein the one or more processes further comprise determining, based at least in part upon the predicted winning bid, the winning bid and the associated winning bidder; and
wherein the determining the predicted winning bid includes:
  determining the winning bid as a bid of the plurality of conditional bids in which a highest predicted bid-generated profit for a marketplace entity is highest.

12. The computer system of claim 10, wherein the determining the predicted winning bid includes:
  determining a predicted bid-generated revenue and a predicted bid-generated costs; and
  subtracting the predicted bid-generated revenue by the predicted bid-generated costs.

13. The computer system of claim 10, wherein the determining the predicted winning bid includes:
  determining a predicted user retention duration; and
  determining the winning bid as a bid of the plurality of conditional bids in which a predicted long-term bid-generated profit for a full duration of the predicted user retention duration is highest.

14. The computer system of claim 10, wherein the determining the predicted winning bid includes:
  determining a predicted user retention duration; and
  determining the winning bid as a bid of the plurality of conditional bids in which a predicted period-specific bid-generated profit for a period of interest predetermined by a marketplace entity is highest.

15. The computer system of claim 10, wherein the determining the predicted winning bid includes:
  determining, for each payment condition of the one or more payment conditions, a likelihood of condition fulfillment.

16. The computer system of claim 15, wherein the determining the predicted winning bid includes:
  multiplying, for each payment condition of the one or more payment conditions, the likelihood of condition fulfillment and an associated conditional payment of the one or more conditional payments.

17. The computer system of claim 10, wherein:
the one or more conditional payments includes a first conditional payment and a second conditional payment;
the one or more payment conditions includes a first payment condition and a second payment condition;

the first conditional payment is withheld from completion at least until the first payment condition is satisfied; and the second conditional payment is withheld from completion at least until the first payment condition and the second payment condition are satisfied.

18. The computer system of claim 10, wherein:

the one or more sensors are used by a plurality of mobile applications; and each of the plurality of vehicle operators uses at least one mobile application of the plurality of mobile applications.

19. A non-transitory computer-readable medium storing instructions for data management, the instructions upon execution by one or more processors of a computing system, cause the computing system to perform one or more processes including:

collecting a plurality of telematics data sets for a plurality of users associated with a plurality of marketplace participants via a software development kit (SDK) configured to be able to be installed on: (1) one or more mobile devices of the plurality of users, (2) one or more third-party applications on the one or more mobile devices of the plurality of users, and (3) one or more on-board computers of one or more automobiles of the plurality of users, wherein the plurality of users include a plurality of vehicle operators, wherein, when the SDK is installed on multiple third-party applications on a same mobile device, a single copy of a telematics data collection program is run while any other telematics collection programs are suspended to save processing power and reduce redundancy, and wherein the collecting of the plurality of telematics data sets for the plurality of users associated with the plurality of marketplace participants via the SDK comprises:

collecting continually a plurality of sensor data sets associated with the plurality of vehicle operators via one or more sensors when each of the one or more sensors has collected a predetermined threshold amount of respective sensor measurements, wherein the one or more sensors include at least one of a Global Positioning Systems (GPS) sensor, an accelerometer, or a gyroscope, the one or more sensors are configured to collect at least one of location sensor data, orientation sensor data, acceleration sensor data, or velocity sensor data;

for each respective vehicle operator of the plurality of vehicle operators:

producing, by the SDK, a uniformed output of a telematics data set of the plurality of telematics data sets in a standardized format, wherein the telematics data set in the standardized format includes a sensor data set of the plurality of sensor data sets in the standardized format;

determining and continually updating one or more telematics inferences based at least in part upon the sensor data set of the plurality of sensor data sets associated with a respective vehicle operator using one or more predictive models each having a respective first plurality of weights provided by a marketplace participant of the plurality of marketplace participants;

generating and continually updating a data profile including the one or more telematics inferences associated with the respective vehicle operator, wherein the data profile includes a universal operator score configured to be utilized for a plurality of uses by the plurality of marketplace participants, wherein a machine learning model is configured to generate the universal operator score by utilizing the sensor data set of the plurality of sensor data sets, wherein the machine learning model has a second plurality of weights that are configured to be trained by utilizing the plurality of sensor data sets associated with the vehicle operator obtained from the GPS sensor, the accelerometer, or the gyroscope, wherein the second plurality of weights include one or more weights that correspond to each of the one or more sensors, and wherein the machine learning model comprises a convolutional neural network;

receiving, from a plurality of bidders of the plurality of marketplace participants, a plurality of conditional bids for a target data profile selected from the data profiles of the plurality of vehicle operators, each conditional bid of the plurality of conditional bids including one or more conditional payments and one or more payment conditions;

determining, for each conditional bid of the plurality of conditional bids and based upon at least the one or more conditional payments and the one or more payment conditions, a predicted winning bid; and transmitting an operator profile associated with a winning bid to an associated winning bidder based at least in part upon the predicted winning bid.

20. The non-transitory computer-readable medium of claim 19, wherein the determining, for each conditional bid of the plurality of conditional bids and based upon at least the one or more conditional payments and the one or more payment conditions, the predicted winning bid further comprises:

assigning a weight modifier to each of the one or more payment conditions, determining a likelihood of success of each of the one or more payment conditions, identifying a respective one of the one or more conditional payments associated with each of the one or more payment conditions, and multiplying the weight modifier, the likelihood of success, and the respective one of the one or more conditional payments associated with each of the one or more payment conditions;

the one or more processes further comprise determining, based at least in part upon the predicted winning bid, the winning bid and the associated winning bidder; and wherein the determining the predicted winning bid includes:

determining the winning bid as a bid of the plurality of conditional bids in which a predicted bid-generated profit for a marketplace entity is highest.

\* \* \* \* \*